US012739882B2

(12) United States Patent
Hwang et al.

(10) Patent No.: US 12,739,882 B2
(45) Date of Patent: Sep. 15, 2026

(54) METHOD FOR TRANSMITTING AND RECEIVING PHYSICAL SIDELINK SHARED CHANNEL IN WIRELESS COMMUNICATION SYSTEM, AND DEVICE FOR SAME

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 18/579,825

(22) PCT Filed: Jul. 14, 2022

(86) PCT No.: PCT/KR2022/010290

§ 371 (c)(1),
(2) Date: Jan. 16, 2024

(87) PCT Pub. No.: WO2023/287224

PCT Pub. Date: Jan. 19, 2023

(65) Prior Publication Data

US 2024/0334476 A1 Oct. 3, 2024

(30) Foreign Application Priority Data

Jul. 15, 2021 (KR) ........................ 10-2021-0093010
Mar. 24, 2022 (KR) ........................ 10-2022-0036836
May 6, 2022 (KR) ........................ 10-2022-0056222

(51) Int. Cl.
*H04W 74/0808* (2024.01)
*H04L 1/1829* (2023.01)
*H04W 74/00* (2009.01)

(52) U.S. Cl.
CPC ....... *H04W 74/0808* (2013.01); *H04L 1/1864* (2013.01); *H04W 74/002* (2013.01)

(58) Field of Classification Search
CPC . H04W 74/0808; H04W 74/002; H04W 4/40; H04W 72/02; H04W 72/12;
(Continued)

(56) References Cited

U.S. PATENT DOCUMENTS

2018/0220418 A1 8/2018 Baghel et al.
2021/0007081 A1* 1/2021 Shin ...................... H04L 1/1887
(Continued)

FOREIGN PATENT DOCUMENTS

CN 111800872 10/2020
CN 112436927 3/2021
(Continued)

OTHER PUBLICATIONS

European Patent Office Application Serial No. 22842486.7, Office Action dated Jun. 24, 2025, 5 pages.
(Continued)

*Primary Examiner* — Rushil P. Sampat
(74) *Attorney, Agent, or Firm* — LEE, HONG, DEGERMAN, KANG & WAIMEY

(57) ABSTRACT

A method for a first terminal to transmit a physical sidelink shared channel (PSSCH) in a wireless communication system according to an embodiment disclosed herein includes the steps of: transmitting, to a second terminal, a physical sidelink control channel (PSCCH) related to scheduling of the PSSCH; and transmitting the PSSCH to the second terminal. One or more reserved resources are determined on the basis of first sidelink control information (SCI) related to the PSCCH. On the basis that the transmission of the PSSCH is related to a pre-defined spectrum, the one or more reserved resources are characterized by including Tx-Rx
(Continued)

switching symbols related to sidelink transmission prior to the transmission of the PSSCH.

15 Claims, 15 Drawing Sheets

(58) Field of Classification Search
CPC ............. H04W 72/1257; H04W 72/53; H04W 72/535; H04W 76/14; H04W 92/18; H04L 1/1864; H04L 1/1887; H04L 1/1896; H04L 5/0055
See application file for complete search history.

(56) References Cited

U.S. PATENT DOCUMENTS

| | | | | |
|---|---|---|---|---|
| 2021/0136699 | A1 | 5/2021 | Scholand et al. | |
| 2021/0136783 | A1* | 5/2021 | Fakoorian | H04W 76/14 |
| 2021/0152408 | A1 | 5/2021 | Yeo et al. | |
| 2021/0306106 | A1 | 9/2021 | Park | |
| 2022/0167402 | A1* | 5/2022 | Liu | H04W 28/04 |
| 2022/0201654 | A1* | 6/2022 | Lee | H04L 5/0053 |
| 2022/0255680 | A1* | 8/2022 | Moon | H04W 72/21 |
| 2023/0171803 | A1* | 6/2023 | Wu | H04W 74/0808 370/329 |

FOREIGN PATENT DOCUMENTS

| | | |
|---|---|---|
| CN | 112671521 | 4/2021 |
| CN | 113508547 | 10/2021 |
| JP | 2021013158 | 2/2021 |
| KR | 1020200036995 | 4/2020 |
| KR | 1020210024197 | 3/2021 |
| WO | 2020251237 | 12/2020 |
| WO | 2022030945 | 2/2022 |

OTHER PUBLICATIONS

LG Electronics, “Discussion on channel access mechanism for sidelink on unlicensed spectrum,” 3GPP TSG RAN WG1 Meeting #109-e, R1-2203713, May 2022, 15 pages.

Japan Patent Office Application No. 2024-502030, Office Action dated Jan. 28, 2025, 5 pages.

Japan Patent Office Application No. 2024-502030, Notice of Allowance dated Aug. 12, 2025, 2 pages.

Intel Corporation, “Summary#3 for AI 7.2.4.2.2 Mode-2 Resource Allocation,” 3GPP TSG RAN WG1 Meeting #97, R1-1907888, May 2019, 28 pages.

PCT International Application No. PCT/KR2022/010290, International Search Report dated Nov. 3, 2022, 3 pages.

European Patent Office Application Serial No. 22842486.7 Search Report dated Oct. 8, 2024, 15 pages.

CAICT, “Considerations on procedures of NR Sidelink,” 3GPP TSG RAN WG1 Meeting #99, R1-1913030, Nov. 2019, 5 pages.

LG Electronics, “Discussion on feasibility and benefits for mode 2 enhancements,” 3GPP TSG RAN WG1 Meeting #104-e, R1-2101786, Jan. 2021, 28 pages.

The State Intellectual Property Office of the People’s Republic of China Application Serial No. 202280049156.1, Office Action dated Jun. 24, 2026, 11 pages.

* cited by examiner

【FIG. 1】
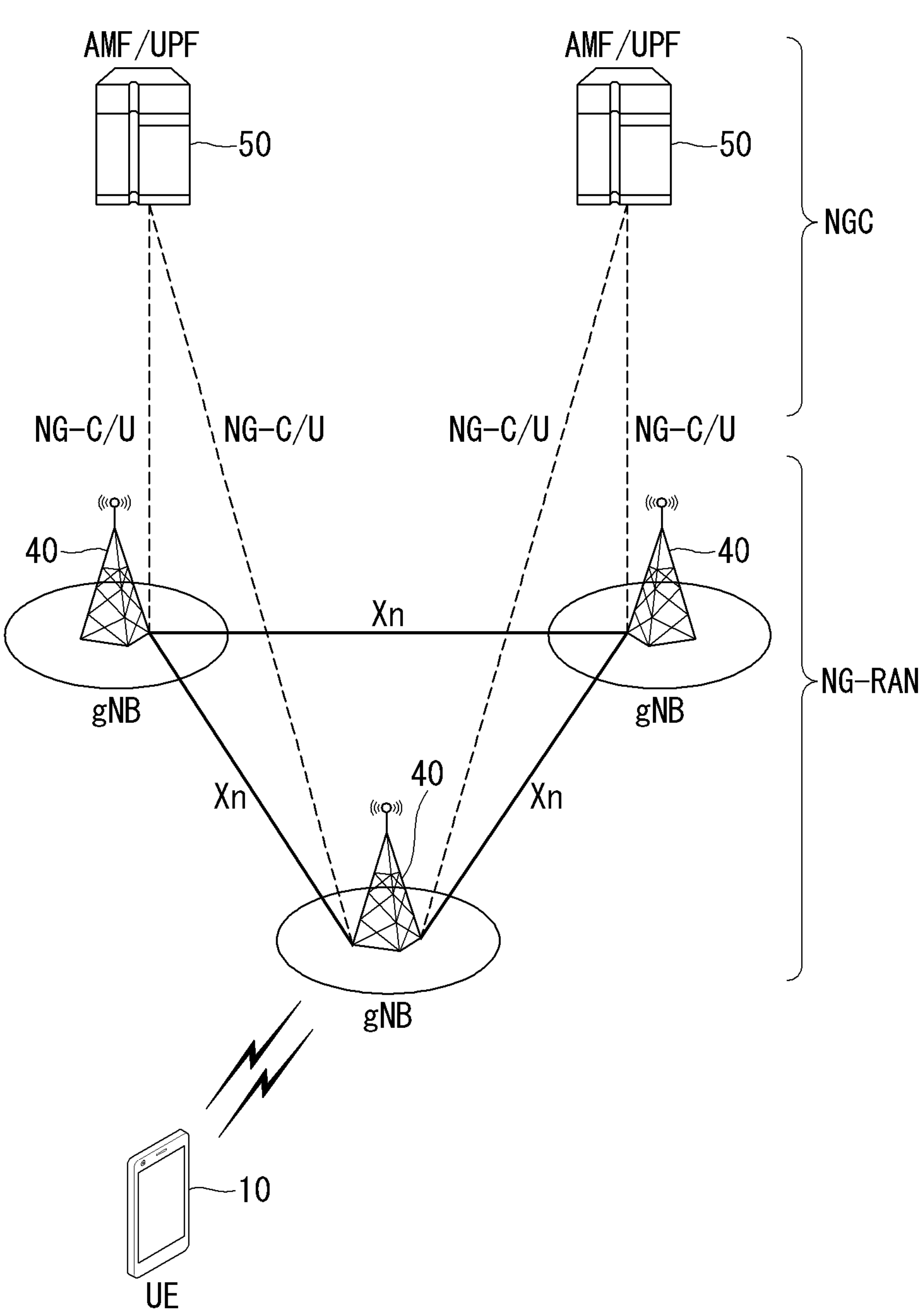

【FIG. 2】
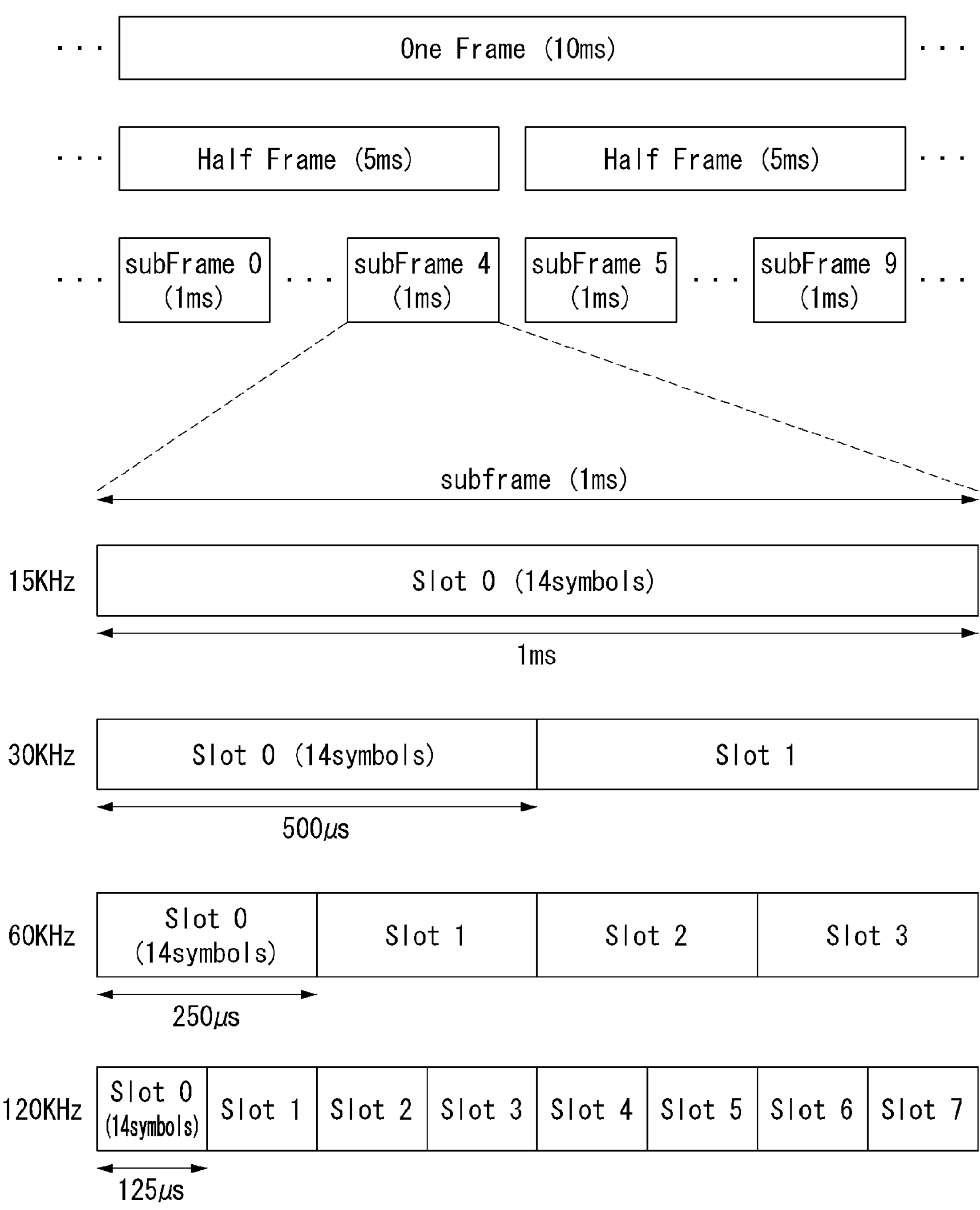

【FIG. 3】
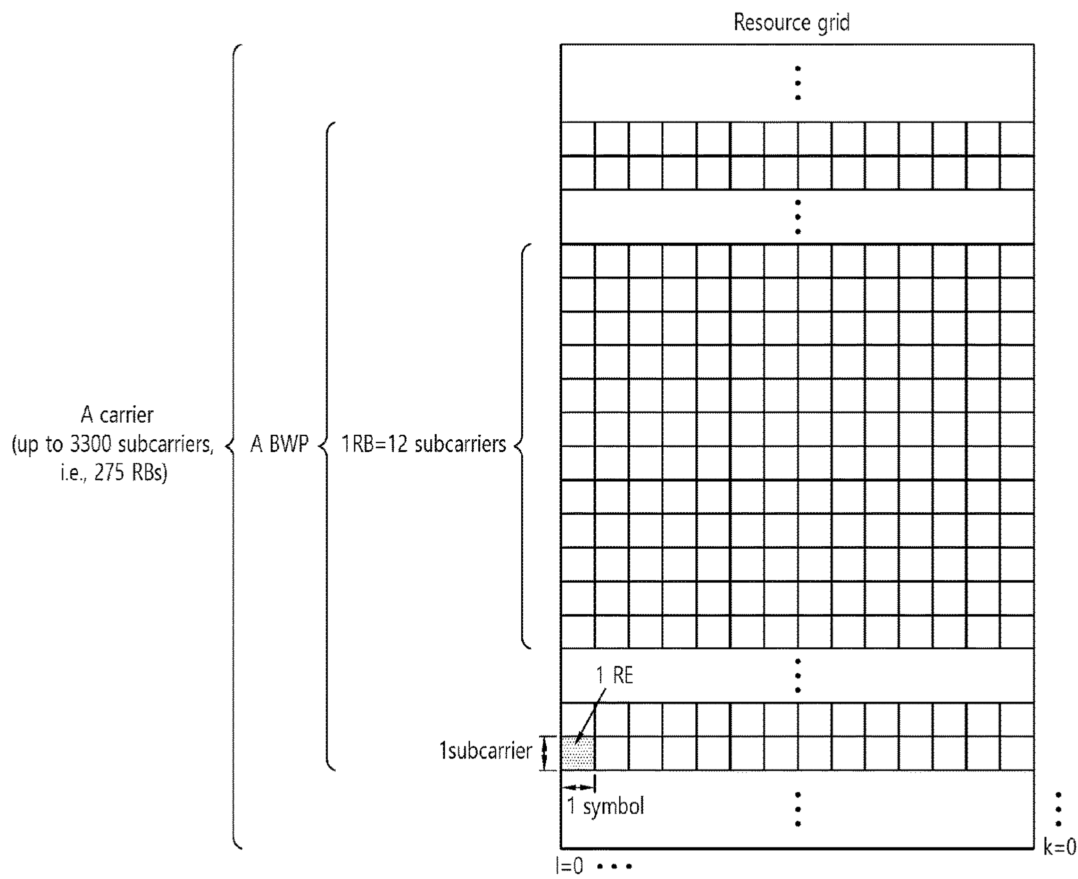
【FIG. 4】
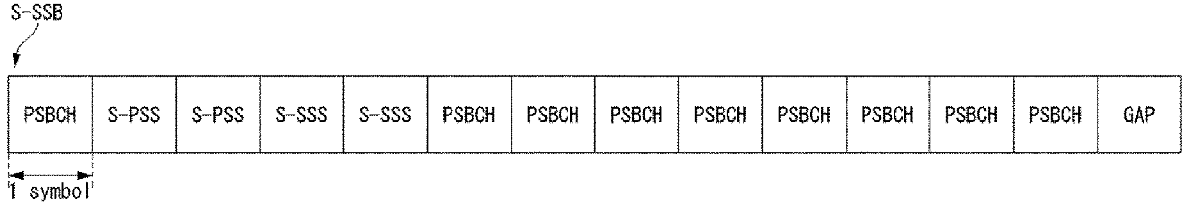

【FIG. 5】
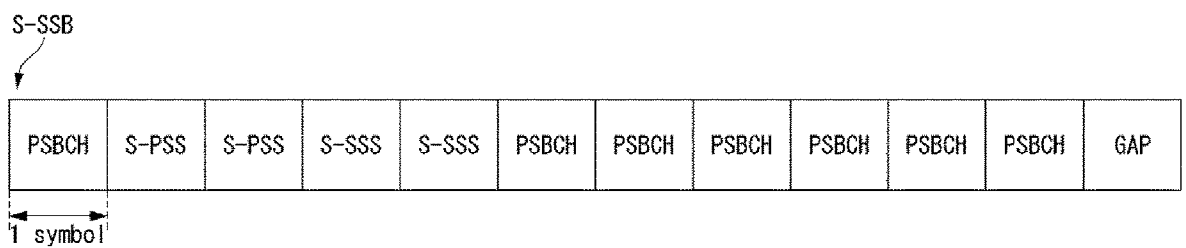
【FIG. 6】
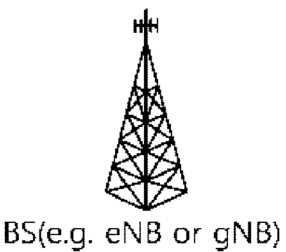
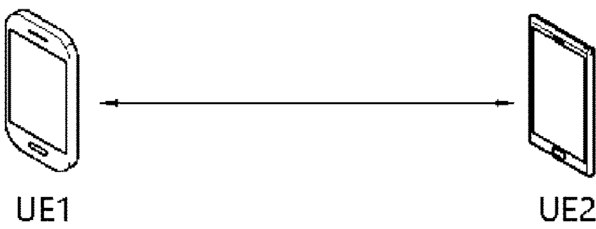

【FIG. 7】
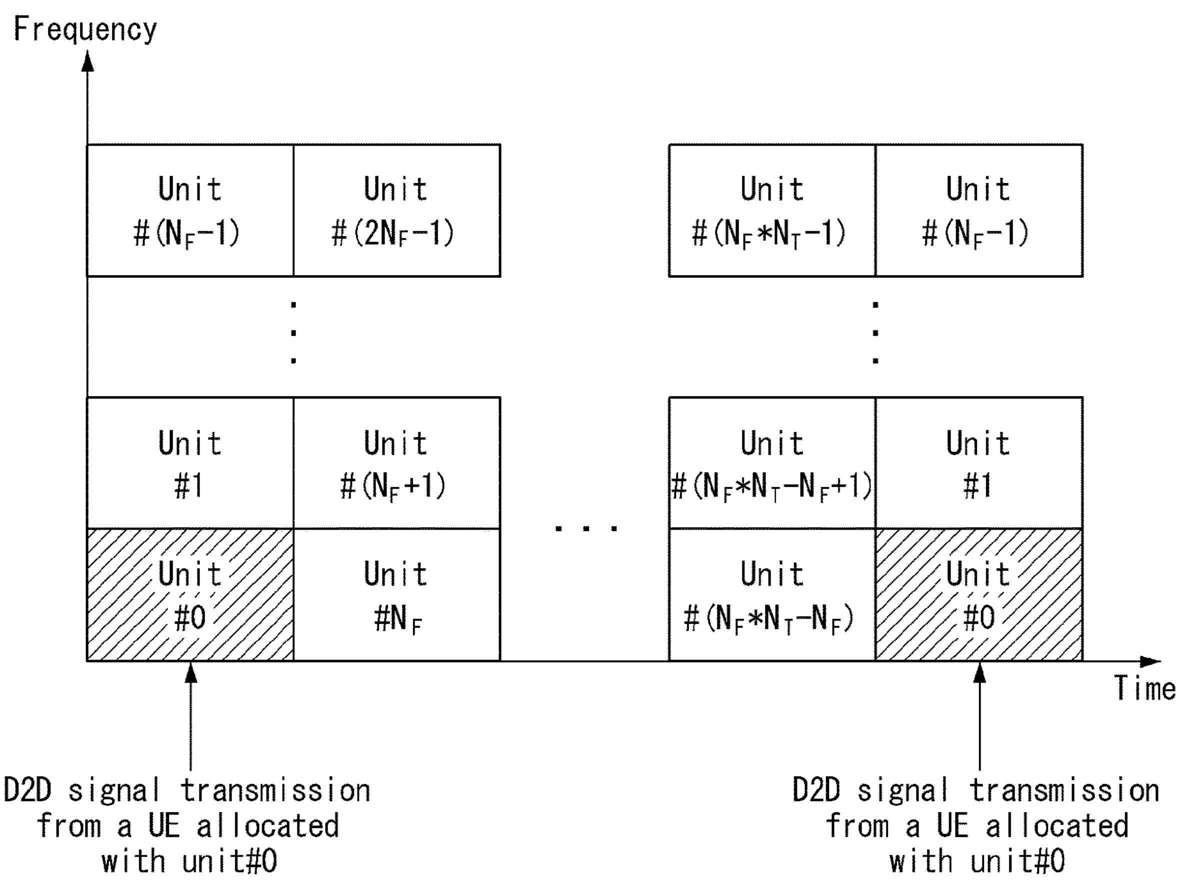
【FIG. 8】
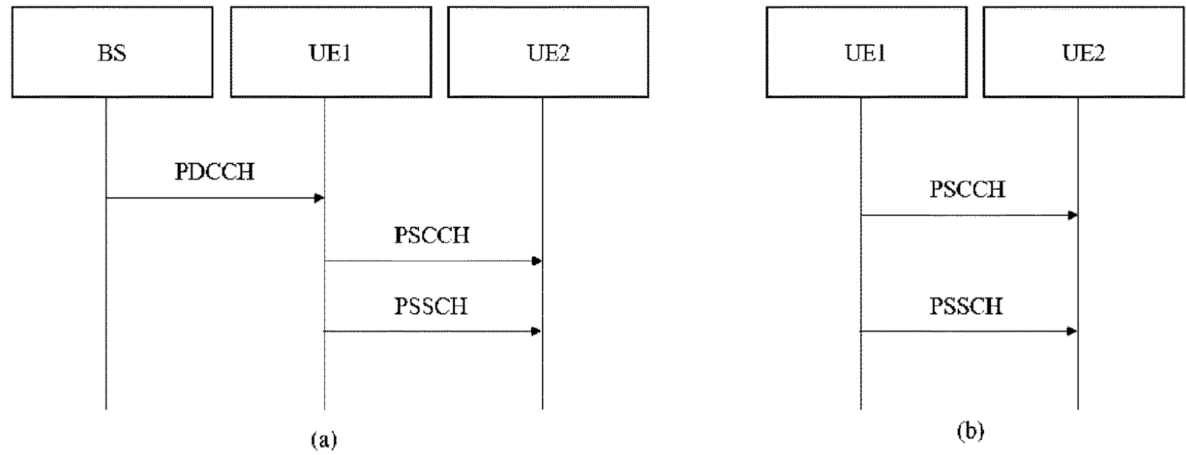

【FIG. 9】
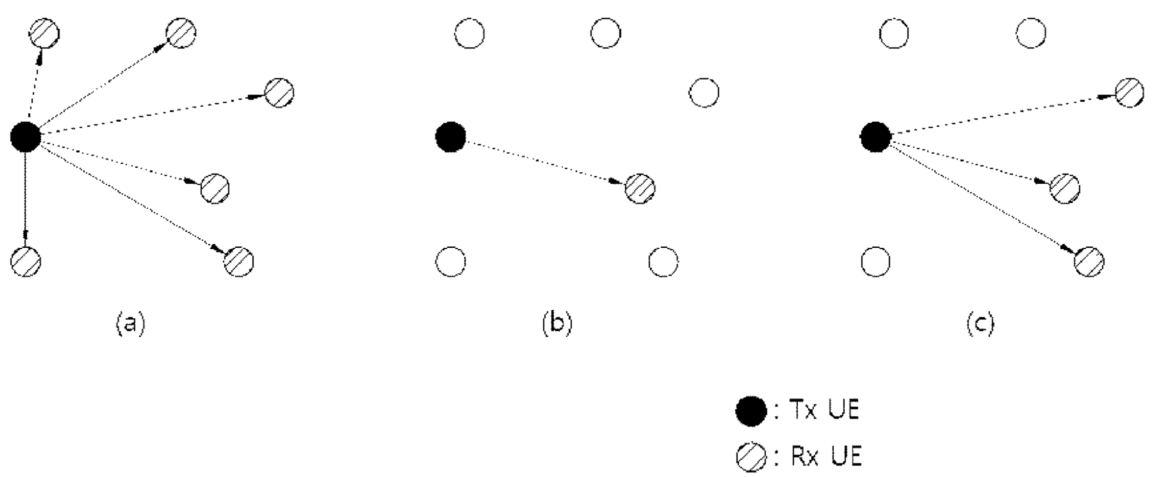
【FIG. 10】
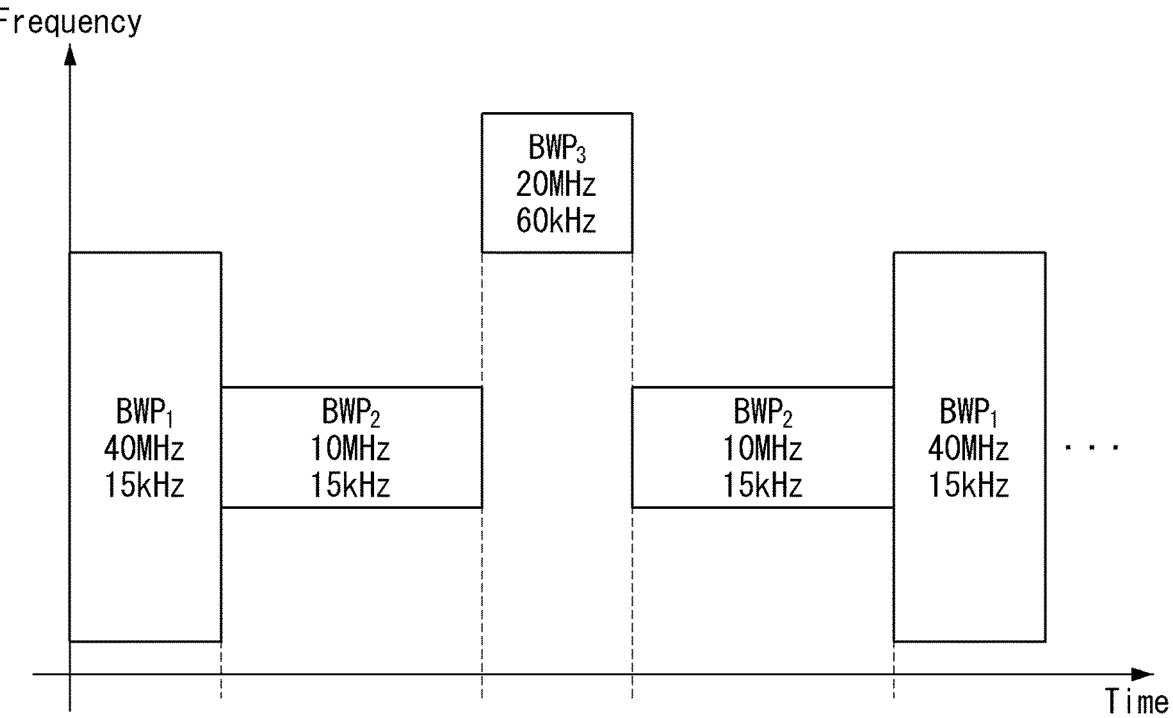

【FIG. 11】
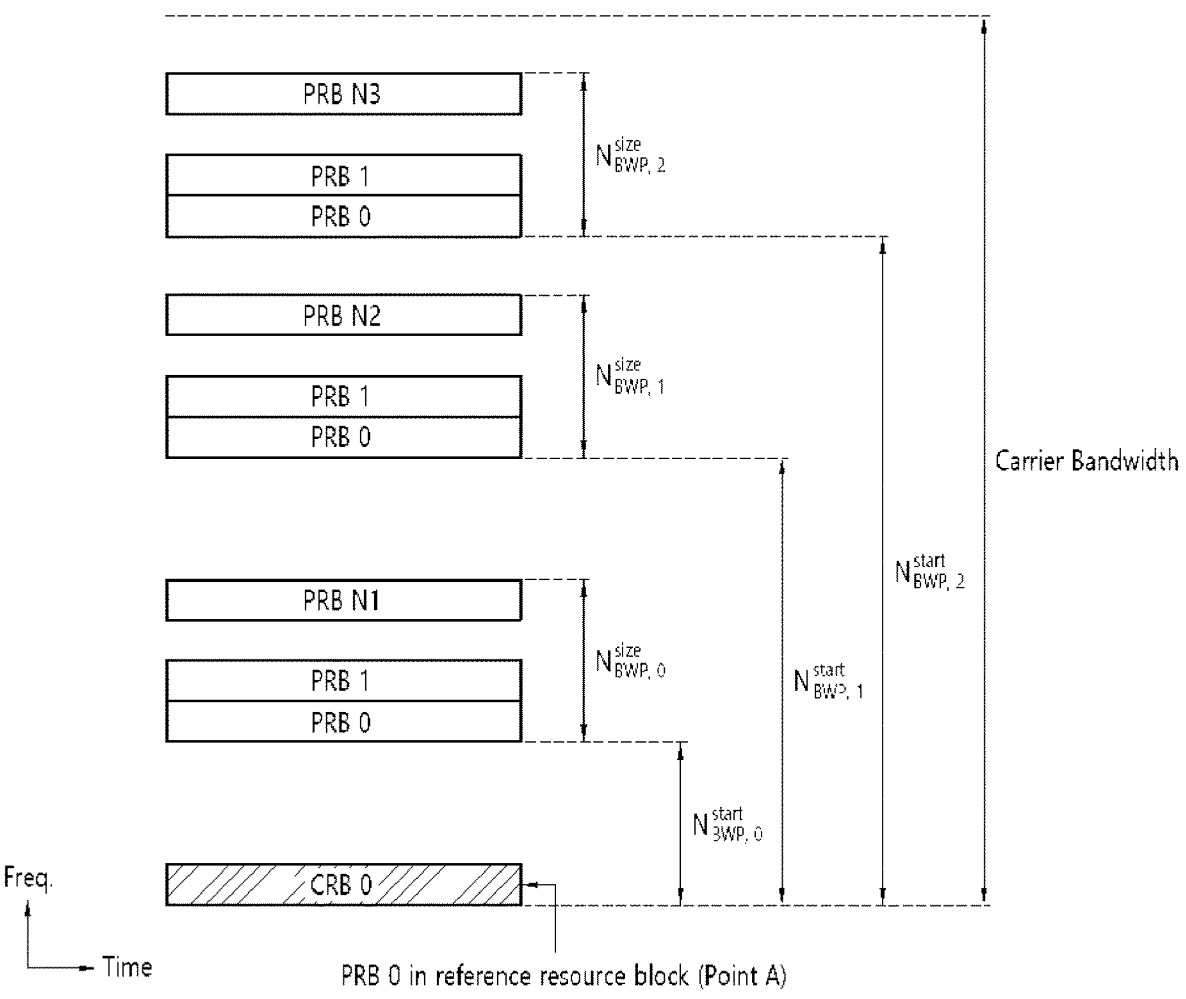

【FIG. 12】
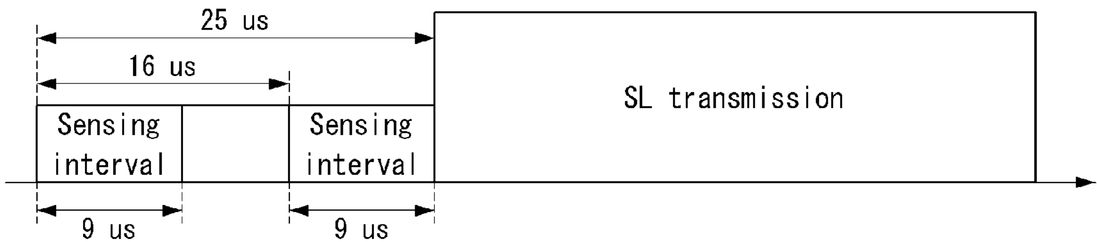
(a) Type 2A channel access procedure
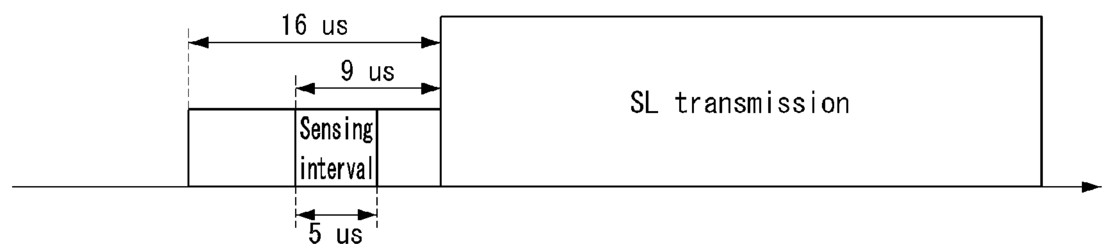
(b) Type 2B channel access procedure
(c) Type 2C channel access procedure 【FIG. 13】
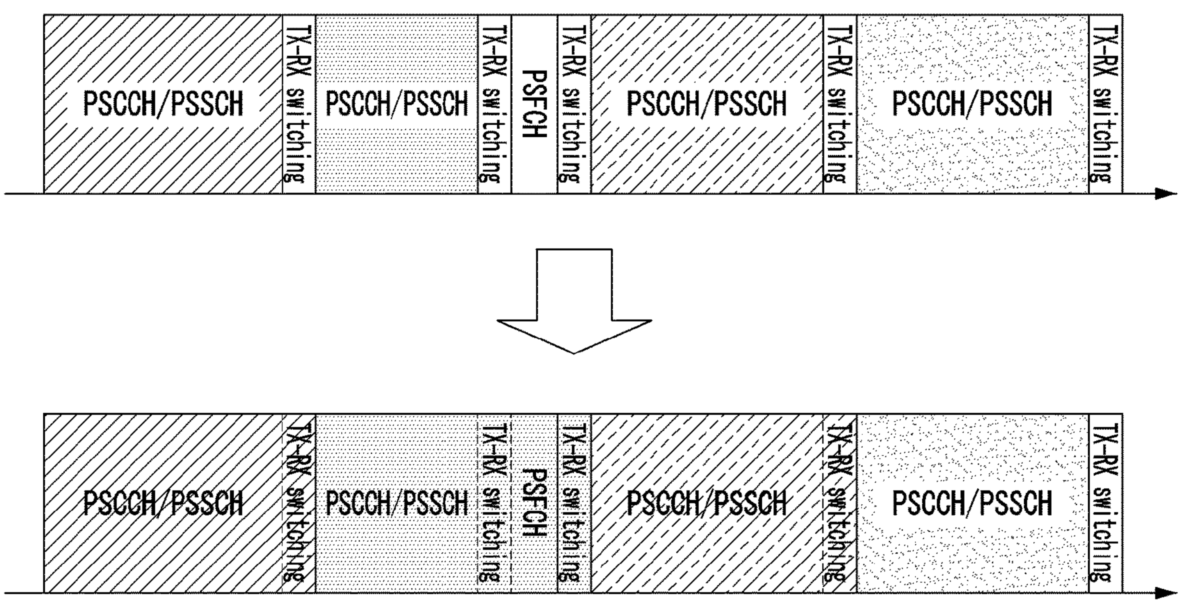
【FIG. 14】
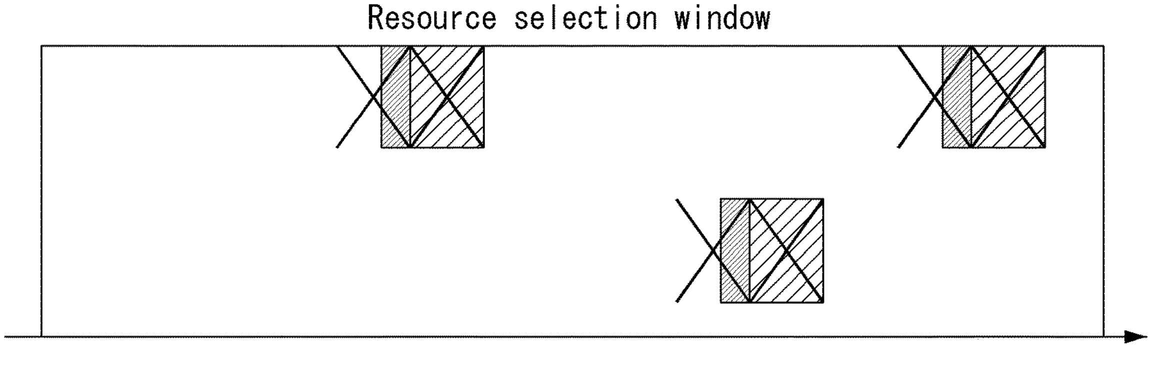

【FIG. 15】
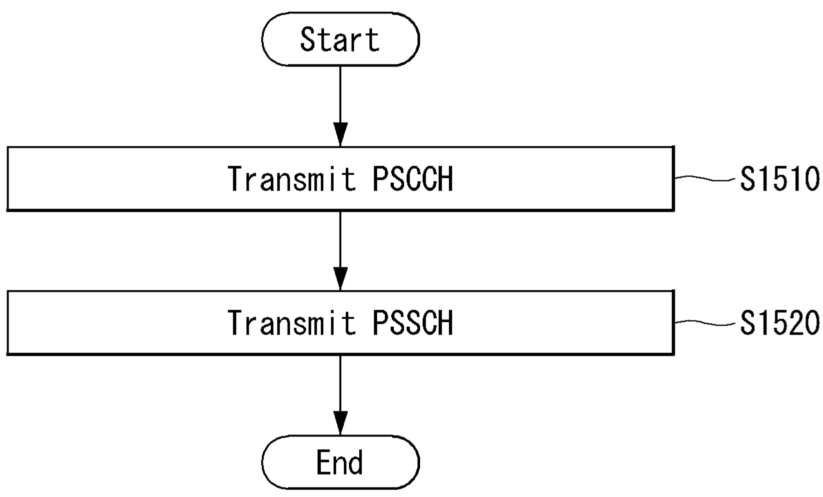
【FIG. 16】
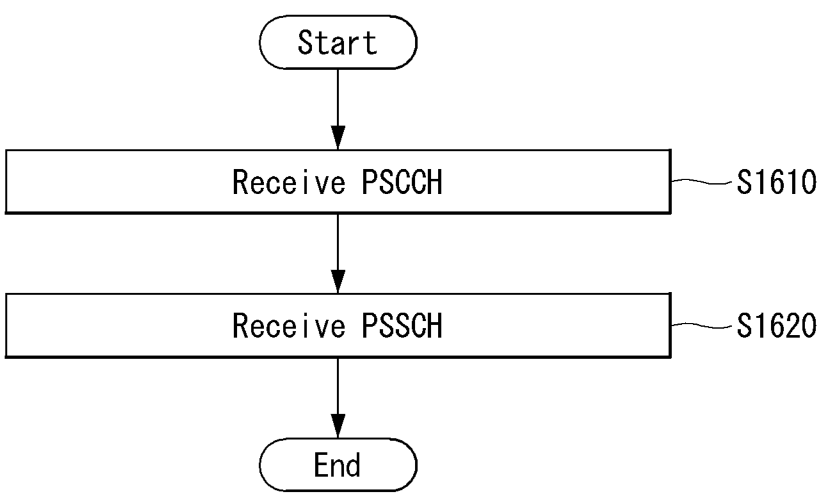

【FIG. 17】
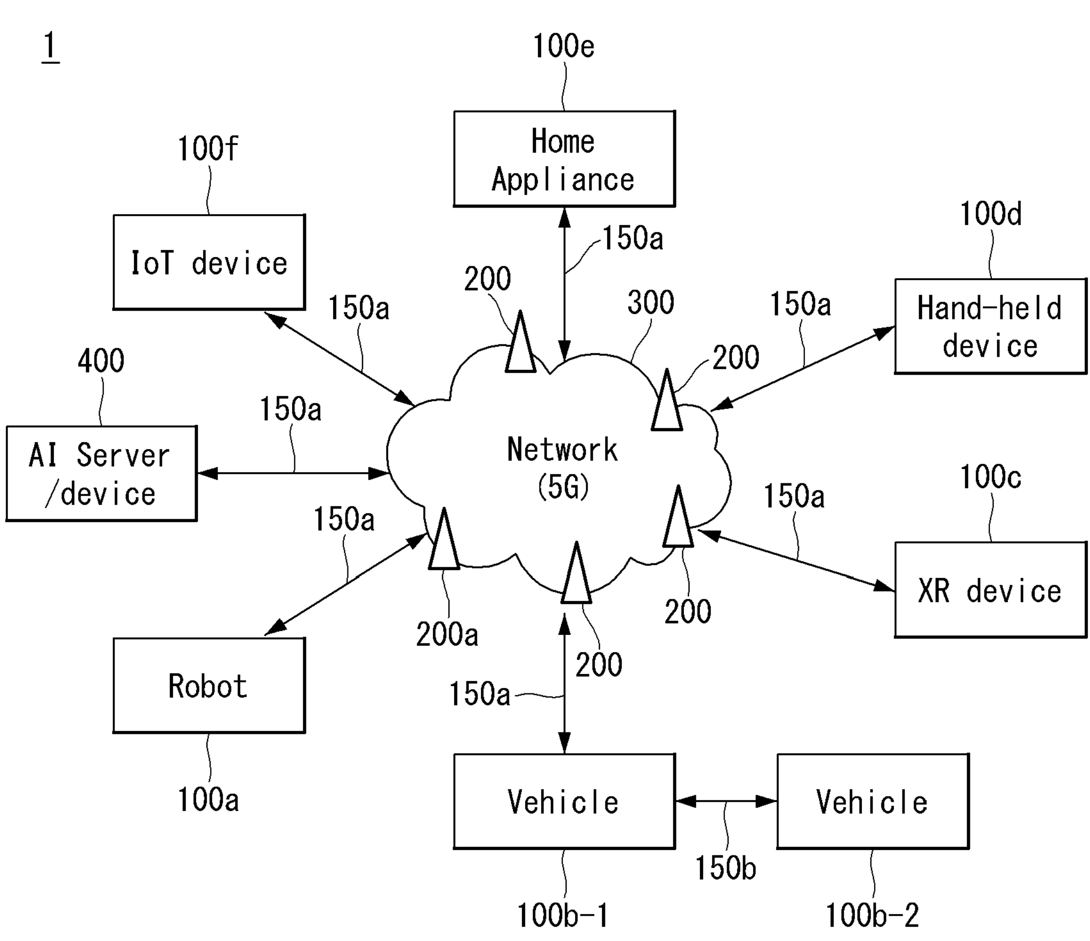

【FIG. 18】
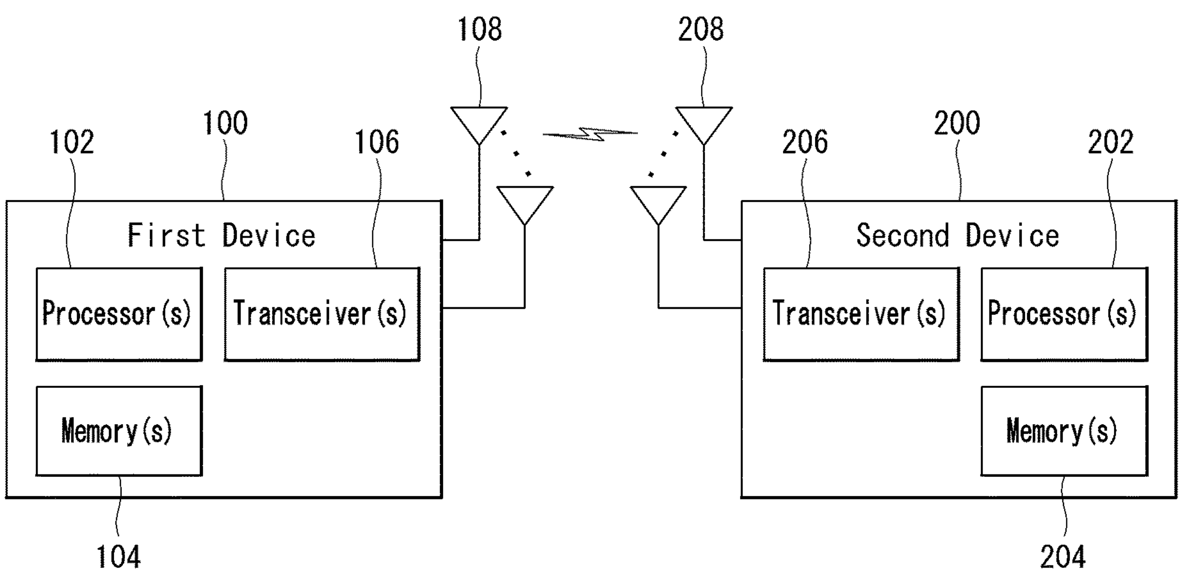

【FIG. 19】
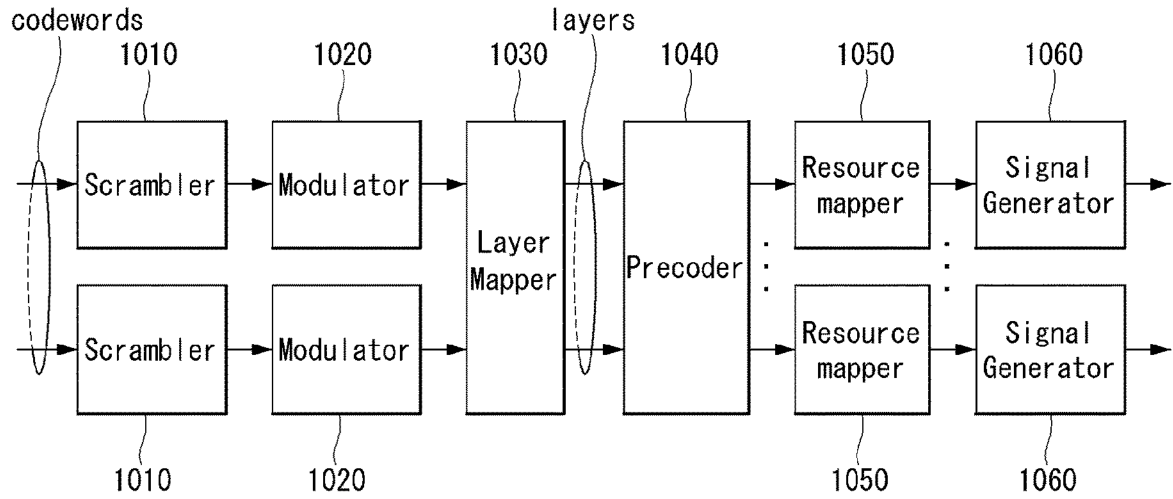
【FIG. 20】
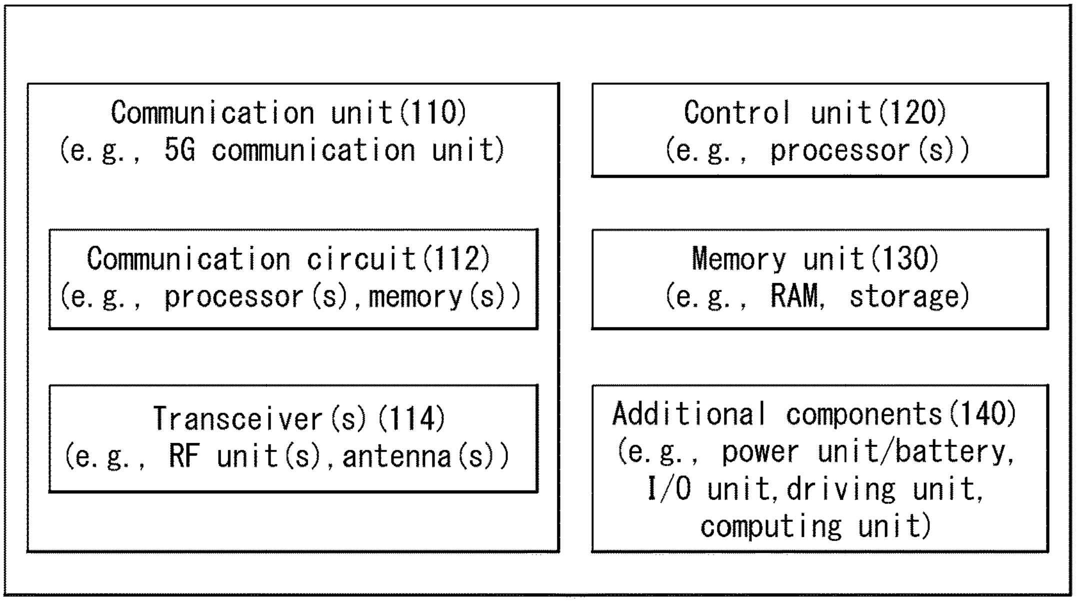

【FIG. 21】
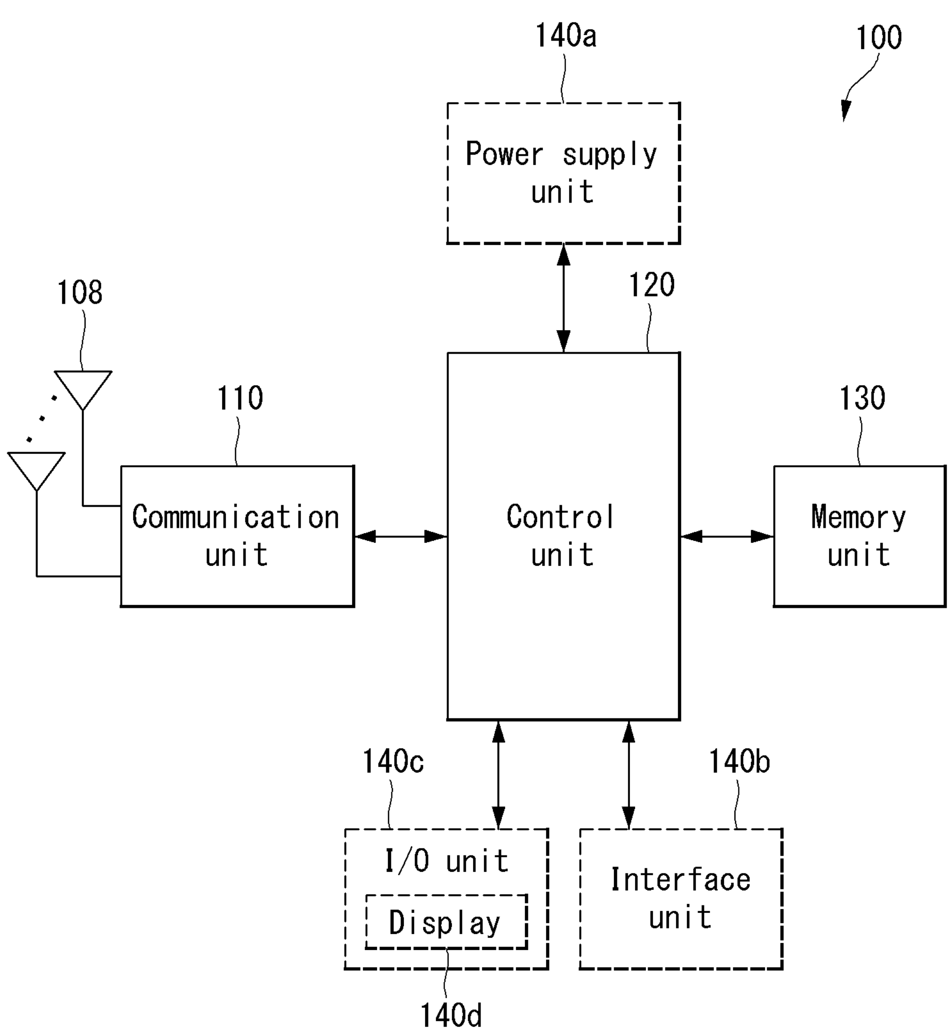

【FIG. 22】
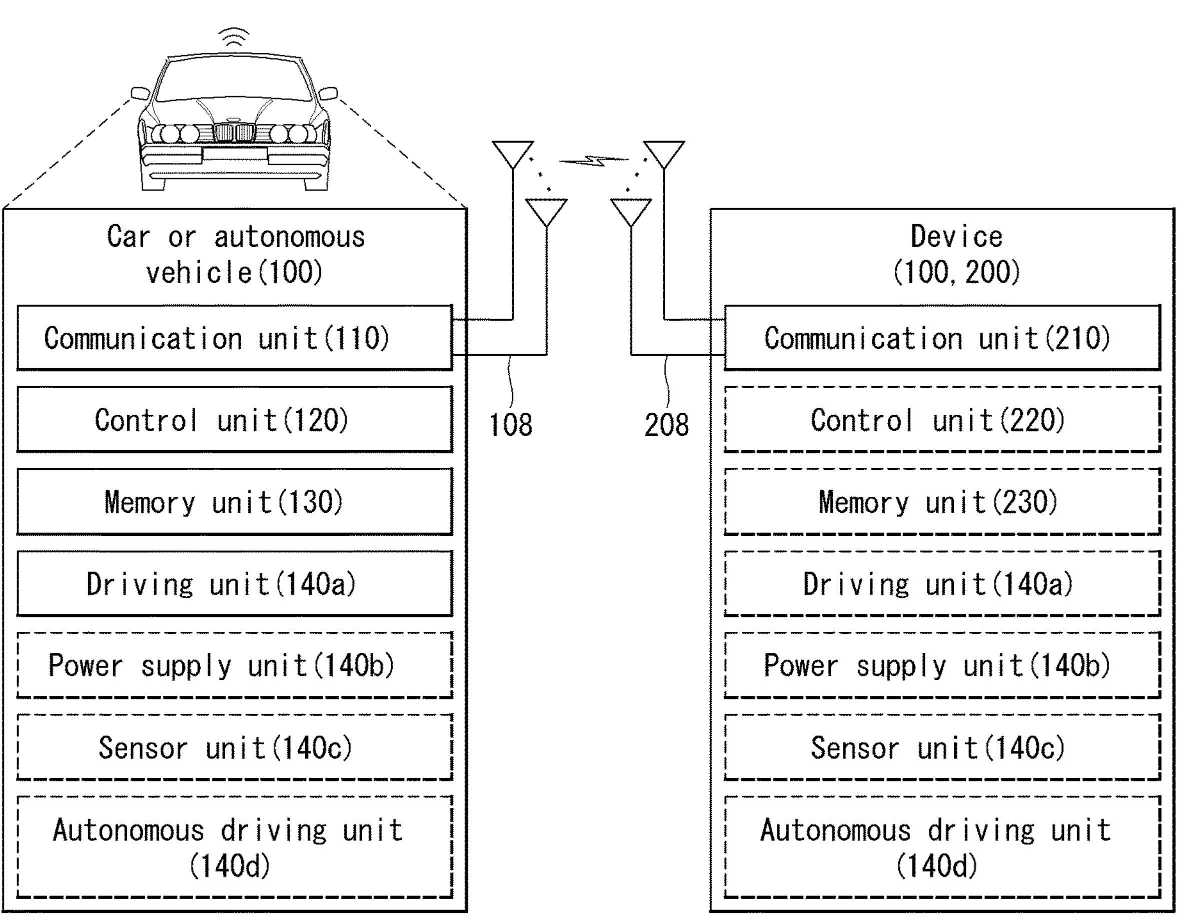

METHOD FOR TRANSMITTING AND RECEIVING PHYSICAL SIDELINK SHARED CHANNEL IN WIRELESS COMMUNICATION SYSTEM, AND DEVICE FOR SAME

CROSS-REFERENCE TO RELATED APPLICATION(S)

This application is the National Stage filing under 35 U.S.C. 371 of International Application No. PCT/KR2022/010290, filed on Jul. 14, 2022, which claims the benefit of earlier filing date and right of priority to Korean Application Nos. 10-2021-0093010, filed on Jul. 15, 2021, 10-2022-0036836, filed on Mar. 24, 2022, and 10-2022-0056222, filed on May 6, 2022, the contents of which are all incorporated by reference herein in their entirety.

TECHNICAL FIELD

The present disclosure relates to a method of transmitting and receiving a physical sidelink shared channel in a wireless communication system, and a device therefor.

BACKGROUND

A wireless communication system is a multiple access system that supports communication of multiple users by sharing available system resources (e.g., a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

Sidelink communication may be performed in an unlicensed spectrum. In this instance, a listen-before-talk (LBT) operation needs to be performed for coexistence with other radio access technologies (RATs) in the unlicensed spectrum.

SUMMARY

If sidelink communication is performed in an unlicensed spectrum as described above, the following problems may occur.

1) If a gap between SL transmissions increases due to LBT-related sensing, other transmissions may intrude and transmission opportunities may be lost. That is, LBT-related channel sensing may be performed before the SL transmission, and if another transmission occurs in a duration for the sensing, a transmission opportunity is lost.

More specifically, if a gap between transmissions is equal to or greater than a predetermined level, a short LBT-related sensing operation may be performed. In this case, a UE intending to perform a second SL transmission after a first SL transmission may lose an opportunity of the second SL transmission due to the short LBT-related sensing operation performed between the first SL transmission and the second SL transmission. That is, a channel for the second SL transmission may be occupied by SL transmission based on the short LBT sensing. Since a result of LBT sensing for the second SL transmission is 'BUSY', the UE cannot perform the second SL transmission.

2) If a duration for LBT related sensing of overlapping reserved resources (resource 1) is not considered in determination of reserved resources, SL transmission based on the previously reserved resource 1 may not be performed. Specifically, it may be assumed a case where only overlapping reserved resources (resource 1) are considered when determining reserved resources for SL communication based on the existing operation. If the duration (resource 2) for LBT related sensing of the resource 1 is not considered, the SL transmission may be performed in the resource 2 determined as the reserved resource. In this case, even if the resource 1 is excluded from the reserved resources, the SL transmission based on the resource 1 may not be performed.

An object of the present disclosure is to provide a method for solving the above-described problems 1) and 2).

Objects of the present disclosure are not limited to the foregoing, and other unmentioned objects would be apparent to one of ordinary skill in the art from the following description.

A method of a first user equipment (UE) for transmitting a physical sidelink shared channel (PSSCH) in a wireless communication system according to an embodiment of the present disclosure comprises transmitting, to a second UE, a physical sidelink control channel (PSCCH) related to a scheduling of the PSSCH, and transmitting, to the second UE, the PSSCH.

One or more reserved resources are determined based on first sidelink control information (SCI) related to the PSCCH.

The one or more reserved resources are based on resources within a resource selection window, and a resource reserved by a first SCI of other UE among the resources within the resource selection window is excluded from the one or more reserved resources.

Based on a transmission of the PSSCH being related to a pre-defined spectrum, the one or more reserved resources include a Tx-Rx switching symbol related to a previous sidelink transmission of the transmission of the PSSCH.

The pre-defined spectrum may be based on an unlicensed spectrum.

The PSSCH related to the Tx-Rx switching symbol may be based on a repetition of the PSSCH for a pre-defined symbol in a slot for the transmission of the PSSCH.

The method may further comprise receiving a physical sidelink feedback channel (PSFCH) from the second UE. The PSFCH may be related to HARQ-ACK information for a reception of the PSSCH.

The PSCCH and the PSSCH may be repeatedly transmitted until time before a reception of the PSFCH. The repeatedly transmitted PSCCH and PSSCH may be based on a same transport block (TB) or different TBs.

A HARQ feedback related to the repeatedly transmitted PSCCH and PSSCH may be deactivated, and the HARQ-ACK information for the reception of the PSSCH may be related to the transmission of the PSSCH based on the one or more reserved resources.

A sidelink signal related to a channel occupancy may be received until time before a reception of the PSFCH after the transmission of the PSSCH.

Based on the PSSCH being transmitted in a channel occupancy time (COT) duration related to the PSSCH, the one or more reserved resources may include the Tx-Rx switching symbol.

A channel secured through an LBT-related sensing may be occupied during the COT duration.

The first SCI related to the PSCCH or a second SCI related to the PSSCH may include information on the COT duration.

Based on the transmission of the PSSCH being related to the pre-defined spectrum, the transmission of the PSSCH may start from a pre-configured slot. The pre-configured slot may be based on a slot that has a starting point later than a starting point of a slot for an uplink transmission among slots capable of a sidelink transmission.

Based on the transmission of the PSSCH being related to the pre-defined spectrum, a resource overlapping with a duration for a listen-before-talk (LBT)-related sensing of the resource reserved by the first SCI of the other UE among the resources within the resource selection window may be excluded from the one or more reserved resources.

A length of the duration for the LBT-related sensing may be determined based on i) a largest value or a smallest value among values related to the LBT-related sensing or ii) an average value of the values related to the LBT-related sensing.

A length of the duration for the LBT-related sensing may be determined based on a preset value.

Based on the transmission of the PSSCH being related to the pre-defined spectrum, the resource reserved by the first SCI of the other UE among the resources within the resource selection window may be excluded from the one or more reserved resources based on a pre-defined condition.

The resource excluded from the one or more reserved resources may be based on a reserved resource within a COT duration related to the first SCI of the other UE.

A first user equipment (UE) transmitting a physical sidelink shared channel (PSSCH) in a wireless communication system according to another embodiment of the present disclosure comprises one or more transceivers, one or more processors configured to control the one or more transceivers, and one or more memories operably connected to the one or more processors.

The one or more memories are configured to store instructions performing operations based on being executed by the one or more processors.

The operations comprise transmitting, to a second UE, a physical sidelink control channel (PSCCH) related to a scheduling of the PSSCH, and transmitting, to the second UE, the PSSCH.

One or more reserved resources are determined based on first sidelink control information (SCI) related to the PSCCH.

The one or more reserved resources are based on resources within a resource selection window, and a resource reserved by a first SCI of other UE among the resources within the resource selection window is excluded from the one or more reserved resources.

Based on a transmission of the PSSCH being related to a pre-defined spectrum, the one or more reserved resources include a Tx-Rx switching symbol related to a previous sidelink transmission of the transmission of the PSSCH.

A device controlling a first user equipment (UE) to transmit a physical sidelink shared channel (PSSCH) in a wireless communication system according to another embodiment of the present disclosure comprises one or more processors, and one or more memories operably connected to the one or more processors.

The one or more memories are configured to store instructions performing operations based on being executed by the one or more processors.

The operations comprise transmitting, to a second UE, a physical sidelink control channel (PSCCH) related to a scheduling of the PSSCH, and transmitting, to the second UE, the PSSCH.

One or more reserved resources are determined based on first sidelink control information (SCI) related to the PSCCH.

The one or more reserved resources are based on resources within a resource selection window, and a resource reserved by a first SCI of other UE among the resources within the resource selection window is excluded from the one or more reserved resources.

Based on a transmission of the PSSCH being related to a pre-defined spectrum, the one or more reserved resources include a Tx-Rx switching symbol related to a previous sidelink transmission of the transmission of the PSSCH.

One or more non-transitory computer readable mediums according to another embodiment of the present disclosure stores one or more instructions.

The one or more instructions perform operations based on being executed by one or more processors.

The operations comprise transmitting, to a second UE, a physical sidelink control channel (PSCCH) related to a scheduling of a physical sidelink shared channel (PSSCH), and transmitting, to the second UE, the PSSCH.

One or more reserved resources are determined based on first sidelink control information (SCI) related to the PSCCH.

The one or more reserved resources are based on resources within a resource selection window, and a resource reserved by a first SCI of other UE among the resources within the resource selection window is excluded from the one or more reserved resources.

Based on a transmission of the PSSCH being related to a pre-defined spectrum, the one or more reserved resources include a Tx-Rx switching symbol related to a previous sidelink transmission of the transmission of the PSSCH.

A method of a second user equipment (UE) for receiving a physical sidelink shared channel (PSSCH) in a wireless communication system according to another embodiment of the present disclosure comprises receiving, from a first UE, a physical sidelink control channel (PSCCH) related to a scheduling of the PSSCH, and receiving, from the first UE, the PSSCH.

One or more reserved resources are determined based on first sidelink control information (SCI) related to the PSCCH.

The one or more reserved resources are based on resources within a resource selection window, and a resource reserved by a first SCI of other UE among the resources within the resource selection window is excluded from the one or more reserved resources.

Based on a reception of the PSSCH being related to a pre-defined spectrum, the one or more reserved resources include a Tx-Rx switching symbol related to a previous sidelink transmission of the reception of the PSSCH.

A second user equipment (UE) receiving a physical sidelink shared channel (PSSCH) in a wireless communication system according to another embodiment of the present disclosure comprises one or more transceivers, one or more processors configured to control the one or more transceivers, and one or more memories operably connected to the one or more processors.

The one or more memories are configured to store instructions performing operations based on being executed by the one or more processors.

The operations comprise receiving, from a first UE, a physical sidelink control channel (PSCCH) related to a scheduling of the PSSCH, and receiving, from the first UE, the PSSCH, One or more reserved resources are determined based on first sidelink control information (SCI) related to the PSCCH.

The one or more reserved resources are based on resources within a resource selection window, and a resource reserved by a first SCI of other UE among the resources within the resource selection window is excluded from the one or more reserved resources.

Based on a reception of the PSSCH being related to a pre-defined spectrum, the one or more reserved resources include a Tx-Rx switching symbol related to a previous sidelink transmission of the reception of the PSSCH.

According to embodiments of the present disclosure, a gap between SL transmissions can be minimized by utilizing a Tx-Rx switching symbol (e.g., a last symbol of a slot for previous sidelink transmission or a symbol immediately following a last symbol for previous sidelink transmission within one slot) not used for SL scheduling. Therefore, embodiments of the present disclosure can solve a problem of losing a transmission opportunity due to an LBT related sensing operation in an unlicensed spectrum. Further, reliability of SL communication in the unlicensed spectrum can be improved.

According to embodiments of the present disclosure, a duration for LBT related sensing of a previously reserved resource can be ensured by excluding the duration for LBT related sensing of the previously reserved resource from reserved resources. Therefore, an SL mode 2 based scheduling operation in an unlicensed spectrum can be performed considering an LBT related sensing operation. Further, even though resources overlapping with reserved resources for SL transmission are not scheduled, a problem of losing a transmission opportunity can be prevented as the duration for LBT related sensing fails to be secured. Further, the previously reserved resource is normally used in SL communication, and thus the SL mode 2 based scheduling operation in the unlicensed spectrum can be improved in terms of resource utilization.

Effects of the present disclosure are not limited to the foregoing, and other unmentioned effects would be apparent to one of ordinary skill in the art from the following description.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 shows a structure of an NR system, based on an embodiment of the present disclosure.

FIG. 2 shows a structure of a radio frame of an NR, based on an embodiment of the present disclosure.

FIG. 3 shows a structure of a slot of an NR frame, based on an embodiment of the present disclosure.

FIG. 4 illustrates a structure of S-SSB, when a CP type is NCP, based on an embodiment of the present disclosure.

FIG. 5 illustrates a structure of S-SSB, when a CP type is ECP, based on an embodiment of the present disclosure.

FIG. 6 shows a UE performing V2X or SL communication based on an embodiment of the present disclosure.

FIG. 7 shows a resource unit for V2X or SL communication based on an embodiment of the present disclosure.

FIG. 8 shows a procedure of performing V2X or SL communication by a UE based on a transmission mode, based on an embodiment of the present disclosure.

FIG. 9 shows three cast types based on an embodiment of the present disclosure.

FIG. 10 shows a plurality of BWPs based on an embodiment of the present disclosure.

FIG. 11 shows a BWP based on an embodiment of the present disclosure.

FIG. 12 illustrates a channel access procedure based on an embodiment of the present disclosure.

FIG. 13 illustrates utilization of a Tx-Rx switching symbol in a sidelink transmission based on an embodiment of the present disclosure.

FIG. 14 illustrates an operation of determining reserved resources based on sidelink resource allocation mode 2 based on an embodiment of the present disclosure.

FIG. 15 is a flow chart illustrating a method for a first UE to transmit a physical sidelink shared channel in a wireless communication system based on an embodiment of the present disclosure.

FIG. 16 is a flow chart illustrating a method for a second UE to receive a physical sidelink shared channel in a wireless communication system based on another embodiment of the present disclosure.

FIG. 17 shows a communication system 1 based on an embodiment of the present disclosure.

FIG. 18 shows wireless devices based on an embodiment of the present disclosure.

FIG. 19 shows a signal process circuit for a transmission signal based on an embodiment of the present disclosure.

FIG. 20 shows another example of a wireless device based on an embodiment of the present disclosure.

FIG. 21 shows a hand-held device based on an embodiment of the present disclosure FIG. 22 shows a vehicle or an autonomous vehicle based on an embodiment of the present disclosure.

DETAILED DESCRIPTION

In various embodiments of the present disclosure, "/" and "," should be interpreted as representing "and/or". For example, "A/B" may mean "A and/or B". Furthermore, "A, B" may mean "A and/or B". Furthermore, "A/B/C" may mean "at least one of A, B, and/or C". Furthermore, "A, B, C" may mean "at least one of A, B, and/or C".

In various embodiments of the present disclosure, "or" should be interpreted as representing "and/or". For example, "A or B" may include "only A", "only B", and/or "both A and B". In other words, "or" should be interpreted as representing "additionally" or "alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features based on an embodiment of the present disclosure will not be limited only to this.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (Qos) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

FIG. 1 shows a structure of an NR system, based on an embodiment of the present disclosure.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

FIG. 2 shows a structure of a radio frame of an NR, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of the number of symbols per slot ($N^{slot}_{symb}$), the number of slots per frame ($N^{frame,u}_{slot}$), and the number of slots per subframe ($N^{subframe,u}_{slot}$) based on an SCS configuration (u), if a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of the number of symbols per slot, the number of slots per frame, and the number of slots per subframe based on the SCS, if an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM (A) numerologies (e.g., SCS, CP length, etc.) between multiple cells being integrate to one UE may be differently configured. Accordingly, a (absolute time) duration of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 KHz/60 kHz a dense-urban, lower latency, wider carrier bandwidth may be supported. In case the SCS is 60 KHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed, and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHZ, etc.) and higher. For example, a frequency band of 6 GHz (or 5850, 5900, 5925 MHz, etc.) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

FIG. 3 shows a structure of a slot of an NR frame, based on an embodiment of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of contiguous subcarriers (e.g., 12 subcarriers) in the frequency domain. A Bandwidth Part (BWP) may be defined as a plurality of contiguous (Physical) Resource Blocks ((P)RBs) in the frequency domain, and the BWP may correspond to one numerology (e.g., SCS, CP length, etc.). A carrier may include a maximum of N number BWPs (e.g., 5 BWPs). Data communication may be performed via an activated BWP. Each element may be referred to as a resource element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Sidelink Synchronization Signal (SLSS) and Synchronization Information

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

A plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission period based on the SCS. For example, the number of S-SSBs transmitted by the transmitting UE to the receiving UE within one S-SSB transmission period may be pre-configured or configured to the transmitting UE. For example, an S-SSB transmission period may be 160 ms. For example, the S-SSB transmission period of 160 ms may be supported for all SCSs.

For example, if the SCS is 15 kHz in FR1, the transmitting UE may transmit 1 or 2 S-SSBs to the receiving UE within one S-SSB transmission period. For example, if the SCS is 30 kHz in FR1, the transmitting UE may transmit 1 or 2 S-SSBs to the receiving UE within one S-SSB transmission period. For example, if the SCS is 60 KHz in FR1, the transmitting UE may transmit 1, 2, or 4 S-SSBs to the receiving UE within one S-SSB transmission period.

For example, if the SCS is 60 KHz in FR2, the transmitting UE may transmit 1, 2, 4, 8, 16, or 32 S-SSBs to the receiving UE within one S-SSB transmission period. For example, if the SCS is 120 KHz in FR2, the transmitting UE may transmit 1, 2, 4, 8, 16, 32, or 64 S-SSBs to the receiving UE within one S-SSB transmission period.

If the SCS is 60 kHz, two types of CP may be supported. In addition, a structure of an S-SSB transmitted by the transmitting UE to the receiving UE may differ depending on a CP type. For example, the CP type may be normal CP (NCP) or extended CP (ECP). Specifically, for example, if the CP type is the NCP, the number of symbols for mapping a PSBCH within an S-SSB transmitted by the transmitting UE may be 9 or 8. Otherwise, for example, if the CP type is the ECP, the number of symbols for mapping the PSBCH within the S-SSB transmitted by the transmitting UE may be 7 or 6. For example, the PSBCH may be mapped to a first/initial symbol within the S-SSB transmitted by the transmitting UE. For example, the receiving UE which receives the S-SSB may perform an automatic gain control (AGC) operation in a first/initial symbol duration of the S-SSB.

FIG. 4 illustrates a structure of S-SSB, when a CP type is NCP, based on an embodiment of the present disclosure.

For example, when a CP type is NCP, a structure of S-SSB, i.e., the order of symbols to which S-PSS, S-SSS, and PSBCH are mapped within S-SSB transmitted by a transmitting UE may refer to FIG. 4.

FIG. 5 illustrates a structure of S-SSB, when a CP type is ECP, based on an embodiment of the present disclosure.

For example, when a CP type is ECP, unlike FIG. 4, the number of symbols to which a transmitting UE maps PSBCH after S-SSS within S-SSB may be 6. Therefore, a coverage of S-SSB may be different depending on whether the CP type is NCP or ECP.

FIG. 6 shows a UE performing V2X or SL communication based on an embodiment of the present disclosure.

Referring to FIG. 6, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

FIG. 7 shows a resource unit for V2X or SL communication based on an embodiment of the present disclosure.

Referring to FIG. 7, all frequency resources of a resource pool may be divided into NF resources, and all time resources of the resource pool may be divided into NT resources. Therefore, NF*NT resource units may be defined in the resource pool. FIG. 7 may show an example of a case where a corresponding resource pool is repeated with a period of NT subframes.

As shown in FIG. 7, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to contiguous PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Resource Allocation in SL

FIG. 8 shows a procedure of performing V2X or SL communication by a UE based on a transmission mode, based on an embodiment of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 based on the resource scheduling. For example, the UE 1 may transmit sidelink control information (SCI) to the UE 2 through a physical sidelink control channel (PSCCH), and then transmit data based on the SCI to the UE 2 through a physical sidelink shared channel (PSSCH).

For example, in the NR resource allocation mode 1, the UE may be provided or allocated with one or more SL transmission resources of one transport block (TB) from the BS through a dynamic grant. For example, the BS may provide the UE with resource for PSCCH and/or PSSCH transmission based on the dynamic grant. For example, a transmitting UE may report to the BS an SL hybrid automatic repeat request (HARQ) feedback received from a receiving UE. In this case, based on an indication within a PDCCH used by the BS to allocate a resource for SL transmission, a PUCCH resource and timing for reporting an SL HARQ feedback to the BS may be determined.

For example, DCI may include information related to a slot offset between DCI reception and first/initial SL transmission scheduled by the DCI. For example, a minimum gap between the DCI for scheduling the SL transmission resource and a first scheduled SL transmission resource may be not less than a processing time of a corresponding UE.

For example, in the NR resource allocation mode 1, for multiple SL transmissions, the UE may be periodically provided or allocated with a resource set from the BS through a configured grant. For example, the configured grant may include a configured grant type 1 or a configured grant type 2. For example, the UE may determine a TB to be transmitted in each of occasions indicated by a given configured grant.

For example, the BS may allocate an SL resource to the UE on the same carrier, or may allocate the SL resource to the UE on a different carrier.

For example, an NR BS may control LTE-based SL communication. For example, the NR BS may transmit NR DCI to the UE to schedule an LTE SL resource. In this case, for example, a new RNTI may be defined to scramble the NR DCI. For example, the UE may include an NR SL module and an LTE SL module.

For example, after the UE including the NR SL module and the LTE SL module receives NR SL DCI from a gNB, the NR SL module may convert the NR SL DCI to an LTE DCI type 5A, and the NR SL module may transfer the LTE DCI type 5A to the LTE SL module in unit of X ms. For example, after the LTE SL module receives the LTE DCI format 5A from the NR SL module, the LTE SL module may apply activation and/or release in a first/initial LTE subframe after Z ms. For example, the X may be dynamically indicated by using a field of DCI. For example, a minimum value of the X may differ depending on UE capability. For example, the UE may report a single value depending on the UE capability. For example, the X may be a positive number.

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selection window by performing a sensing and resource (re) selection procedure. For example, the sensing may be performed in unit of sub-channels. In addition, the UE 1 which has autonomously selected the resource within the resource pool may transmit the SCI to the UE 2 through a PSCCH, and thereafter may transmit data based on the SCI to the UE 2 through a PSSCH.

A re-evaluation operation may be performed for the resource (re) selection. Immediately before performing a transfer on a reserved resource, the corresponding UE re-evaluates a set of resources, that the UE can select, in order to check whether a transmission intended by the UE is still suitable. Based on the sensing result, the re-evaluation may be performed on a slot based on a preset value T3. For example, the re-evaluation operation may be performed in a previous slot (e.g., m-T3) of a slot (m) in which SCI representing the reserved resource(s) is first signaled.

The preset value T3 may be related to pre-emption and/or re-evaluation for SL resource. Specifically, the UE may perform an operation related to pre-emption and/or re-evaluation based on Table 5 below.

TABLE 5

| |
|---|
| A resource(s) of the selected sidelink grant for a MAC PDU to transmit from multiplexing and assembly entity is re-evaluated by physical layer at $T_3$ before the slot where the SCI indicating the resource(s) is signalled at first time as specified in clause 8.1.4 of TS 38.214 [7]. |
| A resource(s) of the selected sidelink grant which has been indicated by a prior SCI for a MAC PDU to transmit from multiplexing and assembly entity could be checked for pre-emption by physical layer at $T_3$ before the slot where the resource(s) is located as specified in clause 8.1.4 of TS 38.214 [7]. |
| NOTE 1: It is up to UE implementation to re-evaluate or pre-empt before 'm − $T_3$' or after 'm − $T_3$' but before 'm'. For re-evaluation, m is the slot where the SCI indicating the resource(s) is signalled at first time as specified in clause 8.1.4 of TS 38.214. For pre-emption, m is the slot where the resource(s) is located as specified in clause 8.1.4 of TS 38.214. |
| If the MAC entity has been configured with Sidelink resource allocation mode 2 to transmit using pool(s) of resources in a carrier as indicated in TS 38.331 [5] or TS 36.331 [21] based on sensing or random selection the MAC entity shall for each Sidelink process: |
| 1> if a resource(s) of the selected sidelink grant which has not been identified by a prior SCI is indicated for re-evaluation by the physical layer as specified in clause 8.1.4 of TS 38.214 [7]; or |
| 1> if a resource(s) of the selected sidelink grant which has not been identified by a prior SCI is indicated for pre-emption by the physical layer as specified in clause 8.1.4 of TS 38.214 [7]: |
| 2> remove the resource(s) from the selected sidelink grant associated to the Sidelink process; |
| 2> randomly select the time and frequency resource from the resources indicated by the physical layer as specified in clause 8.1.4 of TS 38.214 [7] for either the removed resource or the dropped resource, according to the amount of selected frequency resources, the selected number of HARQ retransmissions and the remaining PDB of either SL data available in the logical channel(s) by ensuring the minimum time gap between any two selected resources of the selected sidelink grant in case the PSFCH is configured for this pool of resources, and that a source can be indicated by the time resource assignment of a SCI for a retransmission according to clause 8.3.1.1 of TS 38.212 [9]; |
| NOTE 2: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources. |
| 2> replace the removed or dropped resource(s) by the selected resource(s) for the selected sidelink grant. |
| NOTE 3: If is left for UE implementation to reselect any pre-selected buy not reserved resource(s) other than the resource(s) indicated from pre-emption or re-evaluation by the physical layer during reselection triggered by re-evaluation or per-emption indicated by the physical layer. |
| NOTE 4: It is up to UE implementation whether to set the resource reservation interval in the re-selected resource to replace pre-empted resource. |

TABLE 5-continued

NOTE 5: It is up to UE implementation whether to trigger resource reselection due to deprioritization as specified in clause 16.2.4 of TS 38.213 [6], clause 5.14.1.2.2 of TS 36.321 [22] and clause 5.22.13.1a.
NOTE 6: For the selected sidelink grant corresponds to transmissions of multiple MAC PDU, it is up to UE implementation whether to apply re-evaluation check to the resources in non-initial reservation period that have been signalled neither in the immediate last nor in the current period.

The preset value T3 may be set to the same value as a processing time $$\left(\text{e.g., } T^{SL}_{proc,1}\right)$$

configured for the resource selection of the UE. The following Table 6 illustrates a processing time determined based on a subcarrier spacing configuration ($\mu_{SL}$) of a sidelink bandwidth (SL BWP). For example, the processing time $$\left(T^{SL}_{proc,1}\right)$$

may be configured to determine a start point T1 of a resource selection window.

TABLE 6

| $\mu_{SL}$ | $T^{SL}_{proc,1}$ [slots] |
|---|---|
| 0 | 3 |
| 1 | 5 |
| 2 | 9 |
| 3 | 17 |

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re) selection on the basis of the priority. For example, the resource (re) selection procedure may include a step in which the UE 2 identifies a candidate resource in a resource selection window and a step in which the UE 2 selects a resource for (re) transmission among the identified candidate resources. For example, the resource selection window may be a time interval for selecting a resource for SL transmission by the UE. For example, after the UE 2 triggers resource (re) selection, the resource selection window may start at T1≥0, and the resource selection window may be restricted by a remaining packet delay budget of the UE 2. The T1 may be determined as a value less than or equal to the processing time (e.g., $$T^{SL}_{proc,1}$$

of the above Table 6) configured for the resource selection. For example, when a slot in which the resource (re) selection is triggered is n, the resource selection window may be determined as a time duration of n+T1 to n+T2. The T2 may denote the number of slots that is less than or equal to the number of slots corresponding to the remaining packet delay budget.

For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re) selection procedure. For example, the transmitting UE may use an SCI related to a first/initial RB to reserve an SL resource for initial transmission of a second TB, based on the sensing and resource (re) selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re) transmissions for one TB may be restricted by a configuration or a pre-configuration. For example, the maximum number of HARQ (re) transmissions may be up to 32. For example, in the absence of the configuration or the pre-configuration, the maximum number of HARQ (re) transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re) transmission. For example, a minimum allocation unit of an SL resource may be a slot. For example, a size of a sub-channel may be configured for the UE or may be pre-configured.

Sidelink Control Information (SCI)

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two contiguous SCIs (e.g., 2-stage SCI) to the receiving UE on the PSCCH and/or the PSSCH. The receiving UE may decode the two contiguous SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two contiguous SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

- PSSCH and/or PSCCH related resource allocation information, e.g., the number/positions of time/frequency resources, resource reservation information (e.g., period), and/or
- SL CSI report request indicator or SL (L1) RSRP (and/or SL (L1) RSRQ and/or SL (L1) RSSI) report request indicator, and/or
- SL CSI transmission indicator (or SL (L1) RSRP (and/or SL (L1) RSRQ and/or SL (L1) RSSI) information transmission indicator)) (on PSSCH), and/or
- MCS information, and/or
- Transmit power information, and/or
- L1 destination ID information and/or L1 source ID information, and/or
- SL HARQ process ID information, and/or
- New data indicator (NDI) information, and/or
- Redundancy version (RV) information, and/or
- (Transmission traffic/packet related) QoS information, e.g., priority information, and/or
- SL CSI-RS transmission indicator or information on the number of (to-be-transmitted)
- SL CSI-RS antenna ports
- Location information of a transmitting UE or location (or distance region) information of a target receiving UE (for which SL HARQ feedback is requested), and/or
- Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

In various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

FIG. 9 shows three cast types based on an embodiment of the present disclosure.

Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. Hereinafter, a cooperative awareness message (CAM) and a decentralized environmental notification message (DENM) will be described.

In vehicle-to-vehicle communication, a periodic message-type CAM, an event triggered message-type DENM, or the like may be transmitted. The CAM may include dynamic state information of the vehicle such as direction and speed, static data of the vehicle such as a size, and basic vehicle information such as an exterior illumination state, route details, or the like. A size of the CAM may be 50-300 bytes. The CAM is broadcast, and a latency shall be less than 100 ms. The DENM may be a message generated in an unexpected situation such as a vehicle breakdown, accident, or the like. A size of the DENM may be less than 3000 bytes, and all vehicles within a transmission range may receive a message. In this case, the DENM may have a higher priority than the CAM.

Hereinafter, carrier reselection will be described.

In V2X or SL communication, a UE may perform carrier reselection based on a channel busy ratio (CBR) of configured carriers and/or a ProSe per-packet priority (PPPP) of a V2X message to be transmitted. For example, the carrier reselection may be performed by a MAC layer of the UE. In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability.

CBR may mean the portion of sub-channels in a resource pool in which a sidelink-received signal strength indicator (S-RSSI) measured by the UE is detected to be greater than a pre-configured threshold. There may be a PPPP related to each logical channel, and a configuration of the PPPP value shall reflect a latency required in both a UE and a BS. In carrier reselection, the UE may select one or more carriers from among candidate carriers starting from a lowest CBR in an ascending order of the CBR.

Hereinafter, an RRC connection establishment between UEs will be described.

For V2X or SL communication, a transmitting UE may need to establish a (PC5) RRC connection with a receiving UE. For example, the UE may obtain V2X-specific SIB. For a UE which is configured to transmit V2X or SL communication by a higher layer and which has data to be transmitted, if a frequency at which at least the UE is configured to transmit SL communication is included in the V2X-specific SIB, the UE may establish an RRC connection with another UE without including a transmission resource pool for the frequency. For example, if an RRC connection is established between the transmitting UE and the receiving UE, the transmitting UE may perform unicast communication with respect to the receiving UE through the established RRC connection.

When the RRC connection is established between the UEs, the transmitting UE may transmit an RRC message to the receiving UE.

The receiving UE may perform antenna/resource demapping, demodulation, and decoding for received information. The information may be transferred to the RRC layer via the MAC layer, the RLC layer, and the PDCP layer. Accordingly, the receiving UE may receive the RRC message generated by the transmitting UE.

V2X or SL communication may be supported for a UE of an RRC_CONNECTED mode, a UE of an RRC_IDLE mode, and a UE of an (NR) RRC_INACTIVE mode. That is, the UE of the RRC_CONNECTED mode, the UE of the RRC_IDLE mode, and the UE of the (NR) RRC_INACTIVE mode may perform V2X or SL communication. The UE of the RRC_INACTIVE mode or the UE of the RRC_IDLE mode may perform V2X or SL communication by using a cell-specific configuration included in V2X-specific SIB.

RRC may be used to exchange at least UE capability and AS layer configuration. For example, a UE 1 may transmit UE capability and AS layer configuration of the UE 1 to a UE 2, and the UE 1 may receive UE capability and AS layer configuration of the UE 2 from the UE 2. In case of UE capability transfer, an information flow may be triggered during or after PC5-S signaling for a direct link setup.

Hereinafter, SL radio link monitoring (RLM) will be described.

In case of AS-level link management of unicast, SL radio link monitoring (RLM) and/or radio link failure (RLF) declaration may be supported. In case of RLC acknowledged mode (AM) in SL unicast, the RLF declaration may be triggered by an indication from RLC indicating that the maximum number of retransmissions has been reached. An AS-level link status (e.g., failure) may need to be informed to a higher layer. Unlike the RLM procedure for unicast, a groupcast-related RLM design may not be considered. The RLM and/or RLF declarations may not be necessary between group members for groupcast.

For example, a transmitting UE may transmit a reference signal to a receiving UE, and the receiving UE may perform SL RLM by using the reference signal. For example, the receiving UE may declare SL RLF by using the reference signal. For example, the reference signal may be referred to as an SL reference signal.

Measurement and Reporting for SL

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Hereinafter, physical layer processing will be described.

Based on an embodiment of the present disclosure, a data unit may be a target of physical layer processing in a transmitting side before being transmitted through a radio interface. Based on an embodiment of the present disclosure, a radio signal carrying the data unit may be a target of physical layer processing in a receiving side.

Table 7 may show a mapping relation between an uplink transport channel and a physical channel, and Table 8 may show a mapping relation between uplink control channel information and the physical channel.

TABLE 7

| Transport channel | Physical channel |
|---|---|
| UL-SCH (Uplink-Shared Channel) | PUSCH (Physical Uplink Shared Channel) |
| RACH (Random Access Channel) | PRACH (Physical Random Access Channel) |

TABLE 8

| Control information | Physical channel |
|---|---|
| UCI (Uplink Control Information) | PUCCH (Physical Uplink Control Channel)<br>PUSCH (Physical Uplink Shared Channel) |

Table 9 may show a mapping relation between a downlink transport channel and a physical channel, and Table 10 may show a mapping relation between downlink control channel information and the physical channel.

TABLE 9

| Transport channel | Physical channel |
|---|---|
| DL-SCH (Downlink-Shared Channel) | PDSCH (Physical Downlink Shared Channel) |
| BCH (Broadcast Channel) | PBCH (Physical Broadcast Channel) |
| PCH (Paging Channel) | PDSCH (Physical Downlink Shared Channel) |

TABLE 10

| Control information | Physical channel |
|---|---|
| DCI (Downlink Control Information) | PDCCH (Physical Downlink Control Channel) |

Table 11 may show a mapping relation between an SL transport channel and a physical channel, and Table 12 may show a mapping relation between SL control channel information and the physical channel.

TABLE 11

| Transport channel | Physical channel |
|---|---|
| SL-SCH (Sidelink-Shared Channel) | PSSCH (Physical Sidelink Shared Channel) |
| SL-BCH (Sidelink-Broadcast Channel) | PSBCH (Physical Sidelink Broadcast Channel) |

TABLE 12

| Control information | Physical channel |
|---|---|
| SCI (Sidelink Control Information) | PSCCH (Physical Sidelink Control Channel) |

In the aforementioned physical layer processing of the transmitting/receiving side, time and frequency domain resources related to subcarrier mapping (e.g., an OFDM symbol, a subcarrier, a subcarrier frequency), OFDM modulation, and frequency up/down-conversion may be determined based on resource allocation (e.g., an uplink grant, downlink allocation).

Hybrid Automatic Repeat Request (HARQ) for SL

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Bandwidth Part and Resource Pool

Hereinafter, a bandwidth part (BWP) and a resource pool will be described.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

FIG. 10 shows a plurality of BWPs based on an embodiment of the present disclosure.

Referring to FIG. 10, a BWP1 having a bandwidth of 40 MHz and a subcarrier spacing of 15 kHz, a BWP2 having a bandwidth of 10 MHz and a subcarrier spacing of 15 kHz, and a BWP3 having a bandwidth of 20 MHz and a subcarrier spacing of 60 kHz may be configured.

FIG. 11 shows a BWP based on an embodiment of the present disclosure. It is assumed in the embodiment of FIG. 11 that the number of BWPs is 3.

Referring to FIG. 11, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

The BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

A resource pool may be a group of time-frequency resources that may be used for SL transmission and/or SL reception. From a perspective of the UE, time-domain resources in the resource pool may not be contiguous. A plurality of resource pools may be (pre-) configured to the UE in one carrier. From a perspective of a physical layer, the UE may perform unicast, groupcast, and broadcast communication by using the configured or pre-configured resource pool.

In the present disclosure, a wording "configuration or definition" may be interpreted as being (pre-) configured from the base station or the network (via pre-defined signaling (e.g., SIB, MAC signaling, or RRC signaling). For example, "A may be configured" may include "the base station or network (pre-) configures/defines or announces A for the UE". Alternatively, the wording "configuration or definition" may be interpreted as being pre-configured or defined by a system. For example, "A may be configured" may include "A is pre-configured/defined by the system".

In the next system, a UE may perform sidelink transmission and/or reception operations in an unlicensed spectrum. In this instance, according to transmission of the unlicensed spectrum, there is a need to consider coexistence with other RATs such as WiFi and/or other links of NR-U/LTE-U. In this case, when the UE transmits an SL channel or a signal, the UE needs to perform a listen-before-talk (LBT) operation in the same manner as other technologies for the unlicensed spectrum. In the NR-U, type 1, type 2A, type 2B, and type 2C channel access procedures for DL and UL are introduced. The channel access procedure is described below with reference to FIG. 12.

FIG. 12 illustrates a channel access procedure based on an embodiment of the present disclosure. Specifically, FIG. 12 illustrates a channel access procedure based on type 2A, type 2B, or type 2C.

An operation in an unlicensed spectrum may be preceded by a sensing operation for a channel to be used before performing transmission of a UE, based on regulations or requirements for each spectrum. Only if a channel to be used based on a result of the sensing is determined to be IDLE, the UE may perform transmission for the unlicensed spectrum. In the operation in the unlicensed spectrum, it may be possible to omit or simplify the sensing operation (make a sensing duration relatively small) within a predetermined time after transmission for a specific time duration of the UE. On the other hand, after a predetermined time has passed after the transmission, whether to transmit may be determined after performing a general sensing operation. In the transmission in the unlicensed spectrum, a time duration and/or a size of a frequency occupation area of signals/channels transmitted by the UE may be greater than or equal to a predetermined level based on the regulations or the requirements.

In the next system, the UE may perform sidelink transmission and/or reception operations in the unlicensed spectrum. The operation in the unlicensed spectrum may be preceded by a channel sensing operation (e.g., energy detection/measurement) for a channel to be used before performing the transmission of the UE, based on regulations or requirements for each spectrum.

Only if a channel or RB set to be used based on a result of the channel sensing is determined to be IDLE (e.g., if measured energy is greater than or equal to or below a specific threshold), the UE may perform transmission for the unlicensed spectrum.

If the channel or RB set to be used based on the result of the channel sensing is determined to be BUSY (e.g., if the measured energy is greater than or equal to or exceeds the specific threshold), the UE may cancel all or part of the transmission for the unlicensed spectrum.

In the operation in the unlicensed spectrum, it may be possible to omit or simplify the channel sensing operation (make a channel sensing duration relatively small) within a predetermined time after transmission for a specific time duration of the UE. On the other hand, after a predetermined time has passed after the transmission, whether to transmit may be determined after performing a general channel sensing operation.

In the transmission in the unlicensed spectrum, a time duration and/or a size of a frequency occupation area and/or a power spectral density (PSD) of signals/channels transmitted by the UE may be greater than or equal to a predetermined level based on the regulations or the requirements. The content that channel secured through the initial general channel sensing is occupied for a predetermined time for simplification of the channel sensing in the unlicensed spectrum may be notified through information on a channel occupancy time (COT) duration. A maximum value of a length of the COT duration may be set differently depending on a priority value of a service or a data packet.

A specific channel sensing type within the COT duration can be used only when a time gap between transmissions is equal to or less than a predetermined level, and/or a time gap between sidelink transmissions within the COT duration may need to be equal to or less than a predetermined level so as to prevent other RATs or other nodes from obtaining a transmission opportunity within the COT duration. A physical structure of sidelink is configured such that a last symbol of a sidelink resource within each slot is a TX-RX switching symbol and is not included in an actual transmission resource. The last symbol (TX-RX switching symbol) may be referred to as a guard symbol. In a slot configured with a PSFCH resource, there may be a time gap of several symbols between two PSSCH transmissions contiguous to a PSFCH symbol.

For example, a (pre-) configured SL BWP or an SL operation in the unlicensed spectrum may be (pre-) configured so that all symbols in the slot can perform the SL operation. For example, in the (pre-) configured SL BWP or the SL operation in the unlicensed spectrum, an SL start symbol may be 0 or a first symbol of the slot, and a length of an SL symbol duration may be 14.

For example, the UE may perform sidelink transmission for the last symbol or the TX-RX switching symbol in the SL symbol duration in the slot, and may leave a gap for TX-RX switching until before a predetermined time from an end portion of the symbol. That is, for example, in the unlicensed spectrum, a TX-RX switching duration may be set to be less than one symbol. For example, for the SL operation operating in the unlicensed spectrum, a length of the SL symbol duration in the slot may be set to be greater than or equal to a predetermined level (e.g., a (pre-) set value). For example, for the SL operation operating in the unlicensed spectrum, the number of symbols excluding symbols capable of the SL operation in the slot or the length of the symbol duration may be less than or equal to the predetermined level (e.g., the (pre-) set value). For example, partial time domain mapping for the TX-RX switching symbol may repeat a part of a specific symbol (e.g., first or last symbol) for the sidelink transmission.

For example, all or part of a duration of a TX-RX switching symbol of a previous slot of the sidelink transmission may be included in a transmission resource through an EXTENSION process (e.g., CP EXTENSION, repeating a part of the time duration of the first symbol) in the sidelink transmission. This is described below with reference to FIG. 13.

FIG. 13 illustrates utilization of a Tx-Rx switching symbol in a sidelink transmission based on an embodiment of the present disclosure. Referring to FIG. 13, if continuous sidelink transmission (i.e., sidelink transmission in physically/logically contiguous slots) is assumed, a Tx-Rx switching symbol (e.g., a last symbol in a slot or a symbol following a last symbol of symbols for a previous sidelink transmission) may be utilized as a transmission resource. In the continuous sidelink transmission, a resource configured for PSFCH may be utilized as the transmission resource.

For example, whether to perform and/or a method of EXTENSION for the Tx-Rx switching symbol may vary depending on if a UE performs transmission in two contiguous (logical or physical) slots, and/or if the UE performs reception after transmission, and/or if the UE performs transmission after reception. For example, an operation of including a part of the Tx-Rx switching symbol in the transmission resource may be applied when the UE performs transmission in two contiguous slots. Receiving UEs for two contiguous transmissions (i.e., transmissions in the two contiguous slots) may be the same UEs or different UEs. For example, the two contiguous transmissions may be a case where the UE indicates via SCI. For example, this may be a case where a resource reserved by the UE via SCI is next to a slot transmitting the SCI, or a case where the UE indicates the number of resource repetitions to be 2 or more via the SCI. For example, if the UE performs transmission in the two contiguous (logical or physical) slots, including a part of the Tx-Rx switching symbol in the transmission resource may be based on at least one of the following examples. For example, it may be assumed that there is a sidelink transmission (PSCCH/PSSCH) including a UE (e.g., UE 1) as a receiving UE from SCI received by the UE (e.g., UE 1). A transmitting UE (e.g., UE 2) may include a part of the Tx-Rx switching symbol in a resource for transmission of the PSCCH/PSSCH for the UE 1. For example, it may be assumed that there is a sidelink transmission (PSFCH) including a UE (e.g., UE 2) as a receiving UE from SCI transmitted by the UE (e.g., UE 2). A transmitting UE (e.g., UE 1) may include a part of the Tx-Rx switching symbol in a resource for transmission of the PSFCH for the UE 2.

For example, including a part of the time domain within the Tx-Rx switching symbol as the transmission resource may limit to a case where the UE transmits in the shared COT duration and/or in the same RB set.

For example, whether to perform and/or the method of EXTENSION for the Tx-Rx switching symbol may vary depending on the transmission resource if the UE performs transmission in the two contiguous (logical or physical) slots.

For example, for resources for sidelink transmission in a previous slot and/or a subsequent slot with respect to sidelink transmission in contiguous slots, the UE may perform the sidelink transmission on all the Tx-Rx switching symbols through the EXTENSION. Resources in which the EXTENSION is applied for all the Tx-Rx switching symbols may be based on at least one of the following examples 1) to 4).

1) All RBs in an RB set
2) If a ratio of the number of allocated RBs to the total number of RBs in the RB set is greater than or equal to a (pre) set threshold or a pre-defined threshold
3) Resources including all RBs in a resource pool
4) If a ratio of the number of allocated RBs to the total number of RBs in the resource pool is greater than or equal to a (pre) set threshold or a pre-defined threshold Except when the EXTENSION is applied for all the Tx-Rx switching symbols (i.e., in cases other than the 1) to 4)), the UE may perform the sidelink transmission on some of the Tx-Rx switching symbols through the EXTENSION and may not perform the sidelink transmission in a time duration for channel sensing.

For example, when the UE performs the sidelink transmission in an unlicensed spectrum, through (pre-) configuration i) a symbol for an automatic gain control (AGC) operation may not be supported or ii) the AGC operation may be deactivated. For example, deactivating the AGC operation may mean not to perform an operation of acquiring a first OFDM symbol in the form of copying a second OFDM symbol in the sidelink transmission. For example, deactivating the AGC operation may mean performing encoding modulation symbol mapping for PSCCH and/or second SCI and/or SL-SCH on a first OFDM symbol for PSCCH/PSSCH through rate-matching. For example, deactivating the AGC operation may mean transmitting only one symbol for PSFCH. For example, deactivating the AGC operation may mean limiting and applying to a subsequent transmission when the UE performs transmission in the two contiguous (logical or physical) slots. For example, the transmission in the two contiguous (logical or physical) slots may be limited to when a transmitting UE transmits to the same receiving UE and/or the same receiving UE group. For example, the transmission in the two contiguous (logical or physical) slots may be based on at least one of the following 1) to 4).

1) If resources for sidelink transmission in a previous slot and/or a subsequent slot include all RBs in an RB set
2) If a ratio of the number of allocated RBs to the total number of RBs in the RB set is greater than or equal to a (pre) set threshold or a pre-defined threshold
3) If the resources include all RBs in a resource pool
4) If a ratio of the number of allocated RBs to the total number of RBs in the resource pool is greater than or equal to a (pre) set threshold or a pre-defined threshold In an embodiment of the present disclosure, a relationship between the transmitting UE and the receiving UE may be distinguished by SOURCE ID and/or DESTINATION ID and/or a cast type and/or whether to perform SL HARQ-ACK feedback activation and option and/or HARQ process number.

For example, when the UE provides information on a COT duration, a channel sensing type and/or an EXTENSION method that can be used in the COT duration may be indicated. The channel sensing type and/or the EXTENSION method that can be used in the COT duration may be indicated based on at least one of first SCI, second SCI, MAC CE, and/or PC5-RRC signaling.

For example, information on at least one of the following i) to iii) may be indicated to other UE via the first SCI and/or the second SCI.

i) Information on a COT duration to be shared when transmitting PSCCH/PSSCH
ii) Channel sensing type to be used when transmitting PSFCH
iii) Method and/or length of CP EXTENSION For example, information on at least one of the following i) to iii) may be indicated to other UE via the first SCI and/or the second SCI.

i) Information on a COT duration to be shared when transmitting PSCCH/PSSCH
ii) Channel sensing type for PSCCH/PSSCH to be transmitted by the UE or PSCCH/PSSCH to be received by the UE
iii) Method and/or length of CP EXTENSION For example, information on CP EXTENSION to be used by the UE is intended to consider CP EXTENSION and/or a channel sensing duration corresponding to it in case of resource exclusion when other UE selects available resources based on reception sidelink sensing.

As there occur more frequently cases where the result of channel sensing for transmission based on Uu link due to the sidelink transmission in the unlicensed spectrum is determined to be BUSY, a transmission opportunity related to the Uu link may be lost. Timing advance (TA) is applied to UL transmission. On the other hand, the TA is not applied to SL transmission, and thus there may frequently occur cases where a transmission start time of the sidelink precedes than an UL transmission time in a situation where a slot boundary is not aligned between the UL transmission and the SL transmission. For example, slots capable of the sidelink transmission and slots capable of independently starting the sidelink transmission may be limited as a specific slot set. This is to reduce the frequency in which the sidelink transmission start time precedes the UL transmission time. For example, a set of slots in which the sidelink transmission can start may be (pre-) configured per resource pool and/or per SL BWP and/or per RB set.

For example, the TA may be applied to the sidelink transmission in the unlicensed spectrum. For example, a value of the TA may be a (pre) set value or a value set via PC5-RRC or a value indicated through a physical sidelink broadcast channel (PSBCH) or SL DISCOVERY BURST.

For example, SL transmission and reception and/or resource pool operating in the unlicensed spectrum may not be configured with PSFCH resources. The basis for this is as follows. If PSFCH transmission/reception does not occur and remains reserved, as an interval between the SL transmission and reception increases beyond a predetermined level, the following problem may occur. Resources reserved for the PSFCH may allow other UE and/or other RAT and/or other transmission to invade time resources occupied by an SL operating UE. Hence, the SL operating UE may lose a transmission opportunity. The following embodiments may be considered.

For example, the SL operating UE operating in the unlicensed spectrum may perform SL channel (e.g., the PSCCH/PSSCH or a dummy signal, etc.) transmission on symbols corresponding to the PSFCH resources and/or TX-RX switching symbols between PSSCH and PSFCH in the following i) and/or ii).

i) If PSFCH transmission and/or reception is not performed at time of the PSFCH resources
ii) If the UE perform PSCCH/PSSCH transmission in a slot including the PSFCH resources For example, it may be assumed that the UE does not perform PSFCH transmission and/or reception in the slot as a case in which the UE performs PSCCH/PSSCH transmission in a PSFCH slot. In this instance, the UE may transmit reference a PSFCH and/or an additional CP in the PSFCH symbol and/or the TX-RX switching symbol. For example, the reference PSFCH may be transmitted on resources other than the RB set for PSFCH for transmission of SL HARQ-ACK and/or other control information. For example, when a UE transmitting the PSCCH/PSSCH transmits the PSCCH/PSSCH in the slot including the PSFCH resources, the UE may indicate whether to perform the SL transmission (e.g., PSCCH/PSSCH or dummy signal) for the PSFCH symbol and/or PSSCH-to-PSFCH switching symbol using the first SCI and/or the second SCI. For example, a value indicated via the SCI may be a value based on a PSFCH symbol indicator referenced (or determined based on the PSFCH symbol indicator) when calculating a transport block size (TBS) in the first SCI.

For example, SL HARQ-ACK feedback for TB transmitted on PSCCH/PSSCH in the unlicensed spectrum may mean that a receiving UE indicates to a transmitting UE via PSCCH and/or PSSCH and/or first SCI and/or second SCI and/or MAC CE and/or PC5-RRC signaling. For example, if SL HARQ-ACK is transmitted via the first SCI and/or the second SCI, there may be a flag field indicating whether to schedule the TB for the SCI and/or transmit SL HARQ-ACK information. For example, if the SL HARQ-ACK is transmitted via the first SCI and/or the second SCI, single or multiple SL HARQ-ACK information may be included in the SCI, and information on the PSSCH corresponding to the SL HARQ-ACK may be included together. For example, the information on the PSSCH may include at least one of i) a starting sub-channel index on which the PSSCH is transmitted, ii) a slot index, iii) a source ID, and/or iv) a PSFCH RB subset index, and/or v) a PSFCH resource index. For example, a UE transmitting SL HARQ-ACK may transmit together SL HARQ-ACK information for single or multiple HARQ process(es) for the same source ID-destination ID pair. For example, the UE transmitting the SL HARQ-ACK may simultaneously transmit them even if the source IDs of the TB corresponding to the SL HARQ-ACK are different.

For example, a TB transmitting UE may indicate together whether to activate SL HARQ-ACK feedback when transmitting PSCCH/PSSCH. If the feedback is activated, a TB receiving UE may transmit the PSCCH and/or the PSSCH including the SL HARQ-ACK information within a specific time duration from the time of receiving the PSCCH/PSSCH. For example, the specific time duration may be indicated together in the form of a length of a time duration or in the form of a specific absolute point in time when the PSCCH/PSSCH is transmitted. Alternatively, a length related to the specific time duration may be (pre-) configured and/or configured via PC5-RRC.

For example, a set of slots that are candidates when the resource pool is configured in the unlicensed spectrum may include at least one of i) slots for S-SSB transmission, ii) cell-specific DL slots or symbols, and/or iii) time resources which are not configured with cell-specific DL or UL. The basis for this is as follows. When considering the channel sensing operation, there is no guarantee that S-SSB will be always transmitted in a designated slot. Further, if a time gap between sidelink transmissions increases due to the slot for S-SSB transmission, a simplified channel sensing operation may not be performed.

A transmitting UE in sidelink communication in the unlicensed spectrum may transmit the PSCCH/PSSCH and expect to receive the PSFCH after a predetermined time (e.g., the earliest time of PSFCH resource after a preset minimum PSSCH-to-PSFCH time). A receiving UE may fail to perform the PSFCH transmission because the channel sensing result for the PSFCH resource corresponding to the PSCCH/PSSCH is determined to be BUSY at the time of PSFCH resource. To solve this problem, the following embodiments may be considered.

For example, after the PSCCH/PSSCH transmission, the transmitting UE may continue the transmission for the purpose of occupying a channel of the unlicensed spectrum until a reception time of the PSFCH corresponding to the PSCCH/PSSCH. In this case, for example, the transmitting UE may repeatedly transmit the PSCCH/PSSCH until the reception time of the PSFCH or until before a predetermined time (a time gap between transmissions required to occupy the channel) from the reception time of the PSFCH. For example, when the repeated transmission of PSCCH/PSSCH is performed, a length of a symbol duration for the PSSCH may vary depending on the presence or absence of PSFCH resources in the slot. In this instance, if the symbol length for the PSCCH/PSSCH transmission is shortened, transmission may be omitted in the order of the highest symbol index. If the symbol length for the PSCCH/PSSCH transmission increases, i) the repeated mapping may be performed from a first symbol of the PSCCH/PSSCH in a circular repetition method, or ii) for the PSSCH mapping, mapping on extended symbols may be continued using a rate matching method, or iii) a dummy signal may be mapped and transmitted. For example, all the repeatedly transmitted PSCCH/PSSCH may be for the same TB. For example, in this case, SL HARQ-ACK feedback may be deactivated for the PSCCH/PSSCH corresponding to the repetition. For example, the repeatedly transmitted PSCCH/PSSCH may be for the different TBs.

For example, a UE scheduled to transmit the PSFCH may perform the SL transmission for the purpose of occupying a channel of the unlicensed spectrum until before a PSFCH transmission time from a last symbol (including or not including the TX-RX switching symbol) of the PSCCH/PSSCH corresponding to it or until before a predetermined time (a time difference between transmissions required to occupy the channel) from the PSFCH transmission time. For example, a PSCCH/PSSCH receiving UE may determine whether to transmit the PSFCH after detecting the first SCI and the second SCI, and this may be earlier than an end of PSCCH/PSSCH transmission. For example, an SL signal transmitted by the UE scheduled to transmit the PSFCH for the purpose of occupying the channel may be based on at least one of i) a dummy signal, ii) PSFCH (may be different from a PSFCH signal at an actual PSFCH transmission time) for a specific HARQ-ACK state value, and/or iii) PSCCH/PSSCH for other TB.

For example, the resource pool and/or the SL operation configured in the unlicensed spectrum may not support SL HARQ-ACK feedback option 1 (or NACK-ONLY based retransmission) in a group cast. For example, not supporting the feedback option 1 may mean not configuring the feedback option in the resource pool. Alternatively, the UE may deactivate the feedback option 1 when transmitting the PSCCH/PSSCH. The basis for this is as follows. In the feedback option 1, if the UE fails to transmit the PSFCH due to a listen-before-talk (LBT) failure, a PSCCH/PSSCH transmitting UE may mistakenly determine this to be ACK. On the other hand, in another feedback option, if the UE fails to transmit the PSFCH due to the LBT failure, the PSCCH/PSSCH transmitting UE may determine this to be NACK. The LBT failure may mean that a result of LBT-related sensing was determined to be BUSY. For example, a resource pool and/or an operation carrier for the PSCCH/PSSCH transmission may be different from a resource pool and/or an operation carrier for the PSFCH reception corresponding to it. For example, more specifically, the UE may transmit the PSCCH/PSSCH in the unlicensed spectrum and receive the SL HARQ-ACK feedback for this or the PSFCH in a licensed spectrum. For example, resource pool configuration in the unlicensed spectrum may include carrier information and/or resource pool information in which PSFCH resources corresponding to the PSCCH/PSSCH are positioned.

For example, the PSFCH transmission in the unlicensed spectrum may mean that the UE (repeatedly) transmits across all symbols capable of the SL in a slot or for all symbols in a slot. The basis for this may be that a minimum transmission time interval (TTI) of the UE has to be greater than or equal to a predetermined level based on the regulations of the unlicensed spectrum. That is, for example, the PSSCH and the PSFCH in the unlicensed spectrum may not be TDMed in the same slot. For example, time intervals of PSFCH resources in the same slot may be contiguous to each other without the TX-RX switching symbol.

In the SL operation in the unlicensed spectrum, even if the UE indicates, to other UE, reservation information for resources scheduled to be transmitted via SCI, actual transmission may not be performed due to the LBT failure of the UE at the time of the reservation information. In this case, the following problem may occur. Always excluding the reserved resources from resource candidates through a sensing operation is an unnecessary operation, and this operation may result in the use of resources with a high interference level to secure resources of the UE. Embodiments related to the above-described problem are described below.

For example, a UE receiving SCI from other UE may exclude resources, which overlap with a sensing duration for LBT for reserved resources indicated in the SCI, from resource candidates for potential SL transmission. This is described below with reference to FIG. 14.

FIG. 14 illustrates an operation of determining reserved resources based on sidelink resource allocation mode 2 based on an embodiment of the present disclosure. Referring to FIG. 14, not only other UE's reserved resources in a resource selection window but also a channel sensing interval of the reserved resources may be excluded from resource candidates.

For example, a resource exclusion process of the UE may be an operation applied based on an RSRP measurement value (based on PSCCH DMRS and/or PSSCH DMRS corresponding to SCI indicating the reserved resources) for the reserved resources being greater than or equal to a (pre) set threshold. The basis for this is that a UE that has reserved resources may generate an LBT failure when other UE performs transmission in a sensing duration for LBT, preventing the UE from performing SL transmission in the reserved resources. For example, the sensing duration for LBT to be additionally included in the excluded resources may be a sensing duration actually used by the UE transmitting the SCI. For example, the sensing duration for LBT (e.g., length of the sensing duration) to be additionally included in the excluded resources may be determined based on a largest value or a smallest value among available values for the sensing duration, or an average value (of the available values). For example, the sensing duration for LBT to be additionally included in the excluded resources may be (pre-) configured to the UE. Information on the sensing duration for LBT may be configured to the UE by a base station via higher signaling (e.g., RRC signaling), or may be (pre-) configured to the UE in a UE implementation. For example, the sensing duration for LBT to be additionally included in the excluded resources may be separately indicated in first SCI and/or second SCI and/or MAC CE and/or PC5-RRC signaling and/or a third control information channel indicating the reserved resources. In an embodiment of the present disclosure, for example, the sensing duration for LBT to be additionally included in the excluded resources may be applied at different lengths depending on the situation or time.

For example, a UE receiving SCI from other UE in the unlicensed spectrum may exclude reserved resources indicated in the SCI from resource candidates of the UE. This operation may be performed based on predefined conditions being satisfied. For example, an operation of excluding the reserved resources indicated in the SCI from the resource candidates may be performed if a specific condition is additionally satisfied even if an RSRP measurement value for the reserved resources is greater than or equal to a (pre) set threshold. In this case, for example, the specific condition may be based on at least one of the following i) and/or ii).

i) If a distance between the time at which the SCI indicating the reserved resources is detected and the time of the reserved resources is less than or equal to a predetermined level (e.g., a (pre) set value or a value indicated by SCI or MAC CE)

ii) If the time of the reserved resources is within a channel occupancy time (COT) which is the same as the SCI indicating the reserved resources For example, information on the COT may be indicated by the base station to the UE on PDCCH, or may be indicated by a PSCCH/PSSCH transmitting UE via the first SCI and/or the second SCI and/or the MAC CE. For example, the COT may be shared between the PSCCH/PSSCH transmitting UE and a PSCCH/PSSCH receiving UE after unicast PSCCH/PSSCH transmission for the purpose of PSFCH transmission corresponding to this. For example, the COT may be shared between UEs configured with PC5-RRC. For example, the COT may be shared between UEs performing transmission and reception for the same service type and/or DESTINATION ID. For example, a UE receiving SCI from other UE through the unlicensed spectrum may divide UEs transmitting SCI using (L1-) SOURCE ID and/or (L1-)DESTINATOIN ID within the second SCI. The SCI receiving UE may determine (reserved resources indicated by the SCI per UE) as the excluded resources per UE transmitting the SCI. Based on a percentage of resources actually used with respect to reserved resources indicated by SCI of each UE being greater than or equal to a predetermined level, the SCI receiving UE may determine the reserved resources indicated by the SCI as the excluded resources. For example, the SCI receiving UE may measure/determine at least one of the following i) to v) per UE. The SCI receiving UE may determine whether the percentage of resources actually used is greater than or equal to the predetermined level, based on at least one of the following i) to v).

i) The number of LBT failures ii) LBT failure ratio iii) The number of actual uses of reserved resources iv) The number of actual non-uses of reserved resources v) Percentage of the number of actual non-uses of reserved resources Although an embodiment of the present disclosure describes additional conditions for the UE to determine the excluded resources, other methods and proposals for conditions for canceling the excluded resources can also be expanded from the spirit of the present disclosure.

The proposed methods can be applied to a device to be described below. A processor 202 of a receiving UE may configure at least one BWP. The processor 202 of the receiving UE may control a transceiver 206 of the receiving UE so as to receive a sidelink related physical channel and/or a sidelink related reference signal from a transmitting UE on at least one BWP.

Various embodiments of the present disclosure can be mutually combined.

From an implementation perspective, operations (e.g., operations related to sidelink communication in an unlicensed spectrum) of the first UE/second UE according to the above-described embodiments may be processed by a device (e.g., processors 102 and 202 of FIG. 18) of FIGS. 17 to 22 to be described later.

Further, operations (e.g., operations related to sidelink communication in an unlicensed spectrum) of the first UE/second UE according to the above-described embodiments may be stored in a memory (e.g., memories 104 and 204 of FIG. 18) in the form of commands/programs (e.g., instructions, executable codes) for running at least one processor (e.g., processors 102 and 202 of FIG. 18).

Below, the above-described embodiments are described in detail from a perspective of an operation of the first UE with reference to FIG. 15. Methods to be described below are merely distinguished for convenience of explanation. Thus, as long as the methods are not mutually exclusive, it is obvious that partial configuration of any method can be substituted or combined with partial configuration of another method.

FIG. 15 is a flow chart illustrating a method for a first UE to transmit a physical sidelink shared channel in a wireless communication system based on an embodiment of the present disclosure.

Referring to FIG. 15, a method for a first UE to transmit a physical sidelink shared channel (PSSCH) in a wireless communication system may comprise a PSCCH transmitting step S1510 and a PSSCH transmitting step S1520.

In the step S1510, the first UE transmits a physical sidelink control channel (PSCCH) related to a scheduling of the PSSCH to a second UE. The first UE may be based on the UE 1 of FIG. 8, and the second UE may be based on the UE 2 of FIG. 8. The PSCCH may be related to the resource allocation mode 2 (e.g., (b) of FIG. 8).

One or more reserved resources may be determined based on first sidelink control information (SCI) related to the PSCCH. The first SCI related to the PSCCH may be based on first stage SCI (e.g., SCI format 1A). Second SCI related to the PSSCH may be based on second stage SCI (e.g., SCI formats 2A, 2B, and 2C).

According to an embodiment, the one or more reserved resources may be based on resources within a resource selection window. A resource reserved by first SCI of other UE among the resources within the resource selection window may be excluded from the one or more reserved resources. The other UE may refer to a different UE (e.g., a third UE) from the first UE.

According to the step S1510, an operation of the first UE (100/200 of FIGS. 17 to 22) to transmit the PSCCH related to the scheduling of the PSSCH to the second UE (100/200 of FIGS. 17 to 22) may be implemented by a device of FIGS. 17 to 22. For example, referring to FIG. 18, one or more processors 102 may control one or more transceivers 106 and/or one or more memories 104 so as to transmit the PSCCH related to the scheduling of the PSSCH to the second UE 200.

In the step S1520, the first UE transmits the PSSCH to the second UE.

According to an embodiment, based on a transmission of (the PSCCH and/or) the PSSCH being related to a pre-defined spectrum, the following operation/configuration may be applied. The one or more reserved resources may include a Tx-Rx switching symbol related to a previous sidelink transmission of the transmission of the PSSCH. The pre-defined spectrum may be based on an unlicensed spectrum.

The Tx-Rx switching symbol may refer to a symbol that is not used in scheduling for a sidelink transmission. The Tx-Rx switching symbol may be i) a symbol in one slot or ii) a symbol between slots (e.g., a last symbol of a first slot when the first slot and a second slot are logically/physically contiguous). For example, the Tx-Rx switching symbol may be a symbol following a last symbol of symbols in which the previous sidelink transmission of the transmission of the PSSCH is scheduled in one slot. For example, the Tx-Rx switching symbol may be a last symbol in a slot for the sidelink transmission.

The previous sidelink transmission of the transmission of the PSSCH may be related to a physical sidelink feedback channel (PSFCH) or the PSSCH. For example, the previous sidelink transmission of the transmission of the PSSCH may be based on a sidelink transmission by the second UE or a sidelink transmission by the first UE. Below, a first sidelink transmission and a second sidelink transmission are assumed and described in detail.

The first sidelink transmission and the second sidelink transmission may be performed based on one slot or contiguous slots (e.g., a first slot and a second slot).

For example, from a perspective of an operation of the first UE, the first sidelink transmission and the second sidelink transmission may be based on i) a reception of a first sidelink signal and a transmission of a second sidelink signal or ii) a transmission of the first sidelink signal and the transmission of the second sidelink signal.

For example, from a perspective of an operation of the second UE, the first sidelink transmission and the second sidelink transmission may be based on i) the transmission of the first sidelink signal and the reception of the second sidelink signal or ii) the reception of the first sidelink signal and the reception of the second sidelink signal.

For example, the first sidelink transmission may be related to the PSFCH transmitted to the second UE from the first UE. The second sidelink transmission may be related to the PSSCH transmitted to the second UE by the first UE. The first UE may transmit the PSSCH to the second UE by utilizing the Tx-RX switching symbol (e.g., a symbol following a last symbol of symbols for transmission of the PSFCH in one slot) related to the PSFCH.

For example, the first sidelink transmission may be related to the PSSCH (e.g., a first PSSCH) transmitted to the second UE from the first UE. The second sidelink transmission may be related to a second PSSCH transmitted to the second UE by the first UE transmitting the first PSSCH. The first UE may transmit the second PSSCH to the second UE by utilizing the Tx-RX switching symbol (e.g., a last symbol of a first slot for transmission of a first PSFCH) related to the first PSSCH.

It may be assumed that the first sidelink transmission and the second sidelink transmission are performed based on contiguous slots. That is, the first sidelink transmission may be performed in a first slot, and the second sidelink transmission may be scheduled in a second slot physically/logically contiguous to the first slot. In this instance, the one or more reserved resources may include i) a last symbol (i.e., Tx-RX switching symbol) of the first slot and ii) one or more symbols in the second slot. For example, the first slot and the second slot may be based on physically contiguous slots (e.g., a slot n and a slot n+1). For example, the first slot and the second slot may be based on logically contiguous slots (e.g., a slot n and a slot n+2). The logically contiguous slots may refer to slots that are not contiguous on the time axis but have logical continuity. As a detailed example, if, in three contiguous slots n, n+1, and n+2, the slot n and the slot n+2 are slots for sidelink communication, the slot n and the slot n+2 may be referred to as logically contiguous slots.

According to an embodiment, based on the transmission of the PSSCH being related to the pre-defined spectrum, a resource overlapping with a duration for a listen-before-talk (LBT)-related sensing of the resource reserved by the first SCI of the other UE among the resources within the resource selection window may be excluded from the one or more reserved resources. The present embodiment may be based on an implementation related to an operation of excluding the resource overlapping with the above-described sensing duration for LBT.

For example, a length of the duration for the LBT-related sensing may be determined based on i) a largest value or a smallest value among values related to the LBT-related sensing or ii) an average value of the values related to the LBT-related sensing. The values related to the LBT-related sensing may include a value (e.g., 9 us, 5 us of FIG. 12) representing a duration for channel sensing configured for each type (e.g., Type 2A, Type 2B, etc.) for channel access.

For example, the length of the duration for the LBT-related sensing may be determined based on a preset value. The preset value may be a value set by the base station via RRC signaling or a value set by UE implementation.

According to an embodiment, the PSSCH related to the Tx-Rx switching symbol may be based on a repetition of the PSSCH for a pre-defined symbol in a slot for the transmission of the PSSCH. The present embodiment may be based on an implementation for the above-described EXTENSION operation. For example, it may be assumed that the first sidelink transmission and the second sidelink transmission are performed based on one slot. In this case, the PSSCH related to the Tx-Rx switching symbol may be based on the repetition of the PSSCH for a first symbol of symbols for the transmission of the second sidelink signal (e.g., transmission of the PSSCH or the second PSSCH). For example, it may be assumed that the first sidelink transmission and the second sidelink transmission are performed based on contiguous slots (e.g., the first slot and the second slot). In this case, the PSSCH related to the Tx-Rx switching symbol may be based on the repetition of the PSSCH for a first symbol of the second slot.

According to an embodiment, based on the PSSCH being transmitted in a channel occupancy time (COT) duration related to the PSSCH, the one or more reserved resources may include the Tx-Rx switching symbol. A channel secured through the LBT-related sensing may be occupied during the COT duration. The first SCI related to the PSCCH or the second SCI related to the PSSCH may include information on the COT duration. The information on the COT duration may be transmitted via signaling (e.g., MAC-CE, PC5-RRC) other than the first SCI/second SCI.

As there occur more frequently cases where a result of channel sensing for transmission based on Uu link (UE-BS) due to the sidelink transmission in the unlicensed spectrum is determined to be BUSY, a transmission opportunity related to the Uu link may be lost. In relation to this, the following embodiment may be considered. According to an embodiment, based on the transmission of the PSSCH being related to the pre-defined spectrum (i.e., the unlicensed spectrum), the transmission of the PSSCH may start from a pre-configured slot. The pre-configured slot may be based on a slot that has a starting point later than a starting point of a slot for uplink transmission among slots capable of the sidelink transmission. Through the above-described embodiment, the frequency in which a sidelink transmission start time precedes an UL transmission time can be reduced.

The above-described operation of excluding the reserved resource of the other UE may be limitedly performed based on additional conditions or specific situations. This is described in detail below.

According to an embodiment, based on the transmission of the PSSCH being related to the pre-defined spectrum, a resource reserved by the first SCI of the other UE among the resources within the resource selection window may be excluded from the one or more reserved resources based on a pre-defined condition. The pre-defined condition may be related to a reference signal received power (RSRP) measurement value and/or a time of the reserved resource. The present embodiment may be based on an implementation related to the resource exclusion process of the UE.

For example, based on the RSRP measurement value based on the first SCI of the other UE being greater than or equal to a preset threshold, the resource reserved by the first SCI of the other UE may be excluded from the one or more reserved resources. The RSRP measurement value may refer to an RSRP value measured based on PSCCH DMRS and/or PSSCH DMRS corresponding to SCI indicating the reserved resources.

For example, the resource excluded from the one or more reserved resources may be based on a reserved resource within the COT duration related to the first SCI of the other UE. The present embodiment may be based on the example ii) related to the specific situations described above.

According to the step S1520, an operation of the first UE (100/200 of FIGS. 17 to 22) to transmit the PSSCH to the second UE (100/200 of FIGS. 17 to 22) may be implemented by the device of FIGS. 17 to 22. For example, referring to FIG. 18, one or more processors 102 may control one or more transceivers 106 and/or one or more memories 104 so as to transmit the PSSCH to the second UE 200.

The method may further comprise a step of receiving a physical sidelink feedback channel (PSFCH). In the step of receiving the PSFCH, the first UE may receive the PSFCH from the second UE. The PSFCH may be related to HARQ-ACK information for the reception of the PSSCH. In this instance, a channel occupancy related operation for the PSFCH may be performed. This is described in detail below.

According to an embodiment, the first UE may repeatedly transmit the PSCCH and the PSSCH to the second UE. Specifically, the PSCCH and the PSSCH may be repeatedly transmitted until time before the reception of the PSFCH. The present embodiment may be based on an implementation related to the PSCCH/PSSCH repetition transmission for occupying a channel of the unlicensed spectrum until a reception time of the PSFCH. The repeatedly transmitted PSCCH and PSSCH may be based on the same transport block (TB) or different TBs.

For example, all the repeatedly transmitted PSCCH/PSSCH may be for the same TB. That is, the PSCCH/PSSCH based on the same TB may be transmitted for each repetition transmission. In this case, HARQ feedback related to the repeatedly transmitted PSCCH and PSSCH may be deactivated, and the HARQ-ACK information for the reception of the PSSCH may be related to the transmission of the PSSCH based on the one or more reserved resources. That is, since the repeatedly transmitted PSCCH and PSSCH are transmitted for the purpose of occupying the channel, they may be excluded from HARQ feedback.

For example, the repeatedly transmitted PSCCH/PSSCH may be for the different TBs. That is, the PSCCH/PSSCH based on the different TBs may be transmitted for each repetition transmission.

According to an embodiment, the first UE may receive a sidelink signal related to channel occupancy from the second UE. Specifically, the sidelink signal related to the channel occupancy may be received until time before reception of the PSFCH after the transmission of the PSSCH. The present embodiment may be based on an implementation related to an SL signal transmitted by a UE scheduled to transmit the PSFCH. Specifically, the sidelink signal related to the channel occupancy may be based on the SL signal transmitted by the UE scheduled to transmit the PSFCH for the purpose of the channel occupancy.

According to the above-described step, an operation of the first UE (100/200 of FIGS. 17 to 22) to receive the PSFCH from the second UE (100/200 of FIGS. 17 to 22) may be implemented by the device of FIGS. 17 to 22. For example, referring to FIG. 18, one or more processors 102 may control one or more transceivers 106 and/or one or more memories 104 so as to receive the PSFCH from the second UE 200.

Below, the above-described embodiments are described in detail from a perspective of an operation of the second UE with reference to FIG. 16. Methods to be described below are merely distinguished for convenience of explanation. Thus, as long as the methods are not mutually exclusive, it is obvious that partial configuration of any method can be substituted or combined with partial configuration of another method.

FIG. 16 is a flow chart illustrating a method for a second UE to receive a physical sidelink shared channel in a wireless communication system based on another embodiment of the present disclosure.

Referring to FIG. 16, illustrating a method for a second UE to receive a physical sidelink shared channel (PSSCH) in a wireless communication system may comprise a PSCCH receiving step S1610 and a PSSCH receiving step S1620.

In the step S1610, the second UE receives a physical sidelink control channel (PSCCH) related to a scheduling of the PSSCH from a first UE. The first UE may be based on the UE 1 of FIG. 8, and the second UE may be based on the UE 2 of FIG. 8. The PSCCH may be related to the resource allocation mode 2 (e.g., (b) of FIG. 8).

One or more reserved resources may be determined based on first sidelink control information (SCI) related to the PSCCH. The first SCI related to the PSCCH may be based on first stage SCI (e.g., SCI format 1A). Second SCI related to the PSSCH may be based on second stage SCI (e.g., SCI formats 2A, 2B, and 2C).

According to an embodiment, the one or more reserved resources may be based on resources within a resource selection window. A resource reserved by first SCI of other UE among the resources within the resource selection window may be excluded from the one or more reserved resources. The other UE may refer to a different UE (e.g., a third UE) from the first UE.

According to the step S1610, an operation of the second UE (100/200 of FIGS. 17 to 22) to receive the PSCCH related to the scheduling of the PSSCH from the first UE (100/200 of FIGS. 17 to 22) may be implemented by a device of FIGS. 17 to 22. For example, referring to FIG. 18, one or more processors 202 may control one or more transceivers 206 and/or one or more memories 204 so as to receive the PSCCH related to the scheduling of the PSSCH from the first UE 100.

In the step S1620, the second UE receives the PSSCH from the first UE.

According to an embodiment, based on a reception of (the PSCCH and/or) the PSSCH being related to a pre-defined spectrum, the following operation/configuration may be applied. The one or more reserved resources may include a Tx-Rx switching symbol related to a previous sidelink transmission of the reception of the PSSCH. The pre-defined spectrum may be based on an unlicensed spectrum.

The Tx-Rx switching symbol may refer to a symbol that is not used in scheduling for a sidelink transmission. The Tx-Rx switching symbol may be i) a symbol in one slot or ii) a symbol between slots (e.g., a last symbol of a first slot when the first slot and a second slot are logically/physically contiguous). For example, the Tx-Rx switching symbol may be a symbol following a last symbol of symbols in which the previous sidelink transmission of the reception of the PSSCH is scheduled in one slot. For example, the Tx-Rx switching symbol may be a last symbol in a slot for the sidelink transmission.

The previous sidelink transmission of the reception of the PSSCH may be related to a physical sidelink feedback channel (PSFCH) or the PSSCH. For example, the previous sidelink transmission of the reception of the PSSCH may be based on a sidelink transmission by the second UE or a sidelink transmission by the first UE. Below, a first sidelink transmission and a second sidelink transmission are assumed and described in detail.

The first sidelink transmission and the second sidelink transmission may be performed based on one slot or contiguous slots (e.g., a first slot and a second slot).

For example, from a perspective of an operation of the first UE, the first sidelink transmission and the second sidelink transmission may be based on i) a reception of a first sidelink signal and a transmission of a second sidelink signal or ii) a transmission of the first sidelink signal and the transmission of the second sidelink signal.

For example, from a perspective of an operation of the second UE, the first sidelink transmission and the second sidelink transmission may be based on i) the transmission of the first sidelink signal and the reception of the second sidelink signal or ii) the reception of the first sidelink signal and the reception of the second sidelink signal.

For example, the first sidelink transmission may be related to the PSFCH transmitted to the second UE from the first UE. The second sidelink transmission may be related to the PSSCH transmitted to the second UE by the first UE. The second UE may receive the PSSCH from the first UE in the Tx-RX switching symbol (e.g., a symbol following a last symbol of symbols for transmission of the PSFCH in one slot) related to the PSFCH.

For example, the first sidelink transmission may be related to the PSSCH (e.g., a first PSSCH) transmitted to the second UE from the first UE. The second sidelink transmission may be related to a second PSSCH transmitted to the second UE by the first UE transmitting the first PSSCH. The second UE may receive the second PSSCH from the first UE in the Tx-RX switching symbol (e.g., a last symbol of a first slot for transmission of a first PSFCH) related to the first PSSCH.

It may be assumed that the first sidelink transmission and the second sidelink transmission are performed based on contiguous slots. That is, the first sidelink transmission may be performed in a first slot, and the second sidelink transmission may be scheduled in a second slot physically/logically contiguous to the first slot. In this instance, the one or more reserved resources may include i) a last symbol (i.e., Tx-RX switching symbol) of the first slot and ii) one or more symbols in the second slot. For example, the first slot and the second slot may be based on physically contiguous slots (e.g., a slot n and a slot n+1). For example, the first slot and the second slot may be based on logically contiguous slots (e.g., a slot n and a slot n+2). The logically contiguous slots may refer to slots that are not contiguous on the time axis but have logical continuity. As a detailed example, if, in three contiguous slots n, n+1, and n+2, the slot n and the slot n+2 are slots for sidelink communication, the slot n and the slot n+2 may be referred to as logically contiguous slots.

According to an embodiment, based on the reception of the PSSCH being related to the pre-defined spectrum, a resource overlapping with a duration for a listen-before-talk (LBT)-related sensing of the resource reserved by the first SCI of the other UE among the resources within the resource selection window may be excluded from the one or more reserved resources. The present embodiment may be based on an implementation related to an operation of excluding the resource overlapping with the above-described sensing duration for LBT.

For example, a length of the duration for the LBT-related sensing may be determined based on i) a largest value or a smallest value among values related to the LBT-related sensing or ii) an average value of the values related to the LBT-related sensing. The values related to the LBT-related sensing may include a value (e.g., 9 us, 5 us of FIG. 12)

representing a duration for channel sensing configured for each type (e.g., Type 2A, Type 2B, etc.) for channel access.

For example, the length of the duration for the LBT-related sensing may be determined based on a preset value. The preset value may be a value set by the base station via RRC signaling or a value set by UE implementation.

According to an embodiment, the PSSCH related to the Tx-Rx switching symbol may be based on a repetition of the PSSCH for a pre-defined symbol in a slot for the reception of the PSSCH. The present embodiment may be based on an implementation for the above-described EXTENSION operation. For example, it may be assumed that the first sidelink transmission and the second sidelink transmission are performed based on one slot. In this case, the PSSCH related to the Tx-Rx switching symbol may be based on the repetition of the PSSCH for a first symbol of symbols for the reception of the second sidelink signal (e.g., reception of the PSSCH or the second PSSCH). For example, it may be assumed that the first sidelink transmission and the second sidelink transmission are performed based on contiguous slots (e.g., the first slot and the second slot). In this case, the PSSCH related to the Tx-Rx switching symbol may be based on the repetition of the PSSCH for a first symbol of the second slot.

According to an embodiment, based on the PSSCH being received in a channel occupancy time (COT) duration related to the PSSCH, the one or more reserved resources may include the Tx-Rx switching symbol. A channel secured through the LBT-related sensing may be occupied during the COT duration. The first SCI related to the PSCCH or the second SCI related to the PSSCH may include information on the COT duration. The information on the COT duration may be transmitted via signaling (e.g., MAC-CE, PC5-RRC) other than the first SCI/second SCI.

As there occur more frequently cases where a result of channel sensing for transmission based on Uu link (UE-BS) due to the sidelink transmission in the unlicensed spectrum is determined to be BUSY, a transmission opportunity related to the Uu link may be lost. In relation to this, the following embodiment may be considered. According to an embodiment, based on the reception of the PSSCH being related to the pre-defined spectrum (i.e., the unlicensed spectrum), the reception of the PSSCH may start from a pre-configured slot. The pre-configured slot may be based on a slot that has a starting point later than a starting point of a slot for uplink transmission among slots capable of the sidelink transmission. Through the above-described embodiment, the frequency in which a sidelink transmission start time precedes an UL transmission time can be reduced.

The above-described operation of excluding the reserved resource of the other UE may be limitedly performed based on additional conditions or specific situations. This is described in detail below.

According to an embodiment, based on the reception of the PSSCH being related to the pre-defined spectrum, a resource reserved by the first SCI of the other UE among the resources within the resource selection window may be excluded from the one or more reserved resources based on a pre-defined condition. The pre-defined condition may be related to a reference signal received power (RSRP) measurement value and/or a time of the reserved resource. The present embodiment may be based on an implementation related to the resource exclusion process of the UE.

For example, based on the RSRP measurement value based on the first SCI of the other UE being greater than or equal to a preset threshold, the resource reserved by the first SCI of the other UE may be excluded from the one or more reserved resources. The RSRP measurement value may refer to an RSRP value measured based on PSCCH DMRS and/or PSSCH DMRS corresponding to SCI indicating the reserved resources.

For example, the resource excluded from the one or more reserved resources may be based on a reserved resource within the COT duration related to the first SCI of the other UE. The present embodiment may be based on the example ii) related to the specific situation described above.

According to the step S1620, an operation of the second UE (100/200 of FIGS. 17 to 22) to receive the PSSCH from the first UE (100/200 of FIGS. 17 to 22) may be implemented by the device of FIGS. 17 to 22. For example, referring to FIG. 18, one or more processors 202 may control one or more transceivers 206 and/or one or more memories 204 so as to receive the PSSCH from the first UE 100.

The method may further comprise a step of transmitting a physical sidelink feedback channel (PSFCH). In the step of transmitting the PSFCH, the second UE may transmit the PSFCH to the first UE. The PSFCH may be related to HARQ-ACK information for the reception of the PSSCH. In this instance, a channel occupancy related operation for the PSFCH may be performed. This is described in detail below.

According to an embodiment, the second UE may repeatedly receive the PSCCH and the PSSCH from the first UE. Specifically, the PSCCH and the PSSCH may be repeatedly transmitted until time before the transmission of the PSFCH. The present embodiment may be based on an implementation related to the PSCCH/PSSCH repetition transmission for occupying a channel of the unlicensed spectrum until a reception time of the PSFCH. The repeatedly transmitted PSCCH and PSSCH may be based on the same transport block (TB) or different TBs.

For example, all the repeatedly transmitted PSCCH/PSSCH may be for the same TB. That is, the PSCCH/PSSCH based on the same TB may be transmitted for each repetition transmission. In this case, HARQ feedback related to the repeatedly received PSCCH and PSSCH may be deactivated, and the HARQ-ACK information for the reception of the PSSCH may be related to the reception of the PSSCH based on the one or more reserved resources. That is, since the repeatedly transmitted PSCCH and PSSCH are transmitted for the purpose of occupying the channel, they may be excluded from HARQ feedback.

For example, the repeatedly transmitted PSCCH/PSSCH may be for the different TBs. That is, the PSCCH/PSSCH based on the different TBs may be transmitted for each repetition transmission.

According to an embodiment, the second UE may transmit a sidelink signal related to channel occupancy to the first UE. Specifically, the sidelink signal related to the channel occupancy may be transmitted until time before transmission of the PSFCH after the reception of the PSSCH. The present embodiment may be based on an implementation related to an SL signal transmitted by a UE scheduled to transmit the PSFCH. Specifically, the sidelink signal related to the channel occupancy may be based on the SL signal transmitted by the UE scheduled to transmit the PSFCH for the purpose of the channel occupancy.

According to the above-described step, an operation of the second UE (100/200 of FIGS. 17 to 22) to transmit the PSFCH to the first UE (100/200 of FIGS. 17 to 22) may be implemented by the device of FIGS. 17 to 22. For example, referring to FIG. 18, one or more processors 202 may control one or more transceivers 206 and/or one or more memories 204 so as to transmit the PSFCH to the first UE 100.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 shows a communication system 1 based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various Is signal processing processes (e.g., channel encoding/decoding, modulation/demodulation, and resource mapping/demapping), and resource allocating processes, for transmitting/receiving radio signals, may be performed based on the various proposals of the present disclosure.

FIG. 18 shows wireless devices based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands. The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 19 shows a signal process circuit for a transmission signal based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 20 shows another example of a wireless device based on an embodiment of the present disclosure. The wireless device may be implemented in various forms based on a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place based on a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a random access memory (RAM), a Dynamic RAM (DRAM), a Read Only Memory (ROM), a flash memory, a volatile memory, a non-volatile memory, and/or a combination thereof.

Hereinafter, an example of implementing FIG. 20 will be described in detail with reference to the drawings.

FIG. 21 shows a hand-held device based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 22 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

The invention claimed is:

1. A method of a first user equipment (UE), the method comprising:

transmitting, to a second UE, a physical sidelink control channel (PSCCH) related to a scheduling of a physical sidelink shared channel (PSSCH); and transmitting, to the second UE, the PSSCH, wherein one or more reserved resources are indicated based on first sidelink control information (SCI) related to the PSCCH, wherein the one or more reserved resources are selected based on resources within a resource selection window, and wherein a resource overlapping with a listen-before-talk (LBT) before a reserved resource of other UE is excluded from the selection of the one or more reserved resources.

2. The method of claim 1, wherein the LBT is performed by the other UE to determine whether a channel is idle.

3. The method of claim 1, wherein the PSSCH related to a Tx-Rx switching symbol is based on a repetition of the PSSCH for a pre-defined symbol in a slot for the transmission of the PSSCH.

4. The method of claim 1, further comprising:

receiving a physical sidelink feedback channel (PSFCH) from the second UE, wherein the PSFCH is related to hybrid automatic repeat request-acknowledgement (HARQ-ACK) information for a reception of the PSSCH.

5. The method of claim 4, wherein the PSCCH and the PSSCH are repeatedly transmitted until time before a reception of the PSFCH, and wherein the repeatedly transmitted PSCCH and PSSCH are based on a same transport block (TB) or different TBs.

6. The method of claim 5, wherein a HARQ feedback related to the repeatedly transmitted PSCCH and PSSCH is deactivated, and wherein the HARQ-ACK information for the reception of the PSSCH is related to the transmission of the PSSCH based on the one or more reserved resources.

7. The method of claim 4, wherein a sidelink signal related to a channel occupancy is received until time before a reception of the PSFCH after the transmission of the PSSCH.

8. The method of claim 1, wherein, based on the PSSCH being transmitted in a channel occupancy time (COT) duration related to the PSSCH, the one or more reserved resources include a Tx-Rx switching symbol.

9. The method of claim 8, wherein a channel secured through an LBT-related sensing is occupied during the COT duration.

10. The method of claim 8, wherein the first SCI related to the PSCCH or a second SCI related to the PSSCH includes information on the COT duration.

11. The method of claim 1, wherein the transmission of the PSSCH starts from a pre-configured slot, and wherein the pre-configured slot is based on a slot that has a starting point later than a starting point of a slot for an uplink transmission among slots capable of a sidelink transmission.

12. The method of claim 1, wherein a resource overlapping with the reserved resource of the other UE is excluded from the selection of the one or more reserved resources.

13. The method of claim 12, wherein the reserved resource is within a channel occupancy time (COT) duration related to the other UE.

14. A first user equipment (UE) configured to operate in a wireless communication system, the first UE comprising:

one or more transceivers;

one or more processors configured to control the one or more transceivers; and one or more memories operably connected to the one or more processors, wherein the one or more memories are configured to store instructions performing operations based on being executed by the one or more processors, wherein the operations comprise:

transmitting, to a second UE, a physical sidelink control channel (PSCCH) related to a scheduling of a physical sidelink shared channel (PSSCH); and transmitting, to the second UE, the PSSCH, wherein one or more reserved resources are indicated based on first sidelink control information (SCI) related to the PSCCH, wherein the one or more reserved resources are selected based on resources within a resource selection window, and wherein a resource overlapping with a listen-before-talk (LBT) before a reserved resource of other UE is excluded from the selection of the one or more reserved resources.

15. A second user equipment (UE) configured to operate in a wireless communication system, the second UE comprising:

one or more transceivers;

one or more processors configured to control the one or more transceivers; and one or more memories operably connected to the one or more processors, wherein the one or more memories are configured to store instructions performing operations based on being executed by the one or more processors, wherein the operations comprise:

receiving, from a first UE, a physical sidelink control channel (PSCCH) related to a scheduling of a physical sidelink shared channel (PSSCH); and receiving, from the first UE, the PSSCH, wherein one or more reserved resources are indicated based on first sidelink control information (SCI) related to the PSCCH, wherein the one or more reserved resources are selected based on resources within a resource selection window, and wherein a resource overlapping with a listen-before-talk (LBT) before a reserved resource of other UE is excluded from the selection of the one or more reserved resources.

* * * * *